US009933604B1

(12) United States Patent
Lu

(10) Patent No.: US 9,933,604 B1
(45) Date of Patent: Apr. 3, 2018

(54) COMPACT CATADIOPTRIC LENSES AND LENS SYSTEMS WITH IMPROVED IMAGE QUALITY AND METHODS OF USING SAME

(71) Applicant: Weimin Lu, Novi, MI (US)

(72) Inventor: Weimin Lu, Novi, MI (US)

( * ) Notice: Subject to any disclaimer, the term of this patent is extended or adjusted under 35 U.S.C. 154(b) by 0 days.

(21) Appl. No.: 15/657,990

(22) Filed: Jul. 24, 2017

Related U.S. Application Data

(60) Provisional application No. 62/383,587, filed on Sep. 5, 2016, provisional application No. 62/449,097, filed on Jan. 22, 2017, provisional application No. 62/459,570, filed on Feb. 15, 2017.

(51) Int. Cl.
| | |
|---|---|
| *G02B 13/18* | (2006.01) |
| *G02B 3/08* | (2006.01) |
| *G02B 17/00* | (2006.01) |
| *G02B 17/08* | (2006.01) |
| *G02B 13/00* | (2006.01) |
| *G02B 5/10* | (2006.01) |

(52) U.S. Cl.
CPC ......... *G02B 17/0884* (2013.01); *G02B 13/18* (2013.01); *G02B 17/086* (2013.01); *G02B 5/10* (2013.01); *G02B 13/002* (2013.01); *G02B 17/08* (2013.01); *G02B 17/0808* (2013.01); *G02B 17/0856* (2013.01)

(58) Field of Classification Search
CPC .. G02B 17/08; G02B 13/002; G02B 17/0808; G02B 17/086; G02B 17/0856; G02B 5/10
USPC ....... 359/708, 712, 718, 719, 726–731, 737, 359/741, 744
See application file for complete search history.

(56) References Cited

U.S. PATENT DOCUMENTS

| | | | | |
|---|---|---|---|---|
| 929,795 | A | * | 8/1909 | Siedentopf ......... G02B 19/0028 359/727 |
| 2,726,574 | A | | 12/1955 | Mandler |
| 4,344,676 | A | * | 8/1982 | Shafer ..................... G02B 3/00 359/730 |
| 4,666,259 | A | | 5/1987 | Iizuka |
| 4,714,307 | A | | 12/1987 | Palmer |
| 4,759,761 | A | | 7/1988 | Portnoy |
| 5,042,928 | A | * | 8/1991 | Richards ............ G02B 17/0808 359/724 |
| 5,452,126 | A | * | 9/1995 | Johnson ................. G02B 23/00 359/726 |
| 5,930,055 | A | * | 7/1999 | Eisenberg .......... G02B 17/0808 359/727 |
| 7,826,151 | B2 | | 11/2010 | Tsai |
| 7,843,650 | B1 | | 11/2010 | Roberts |

(Continued)

*Primary Examiner* — Evelyn A Lester
(74) *Attorney, Agent, or Firm* — Carrier Blackman & Associates, P.C.; Joseph P. Carrier; William D. Blackman

(57) ABSTRACT

A catadioptric telephoto lens system which: receives incident light rays in a parallel path of both catoptrics and dioptrics, where some of the incident light rays go through a reflective path involving mirrors/reflective surfaces and others of the incident light rays go through a refractive path involving lenses; or receives incident light rays in a serial path of catoptrics and dioptrics, where all the incident light rays initially go through a reflective path involving mirrors/ reflective surfaces and then go through a refractive path involving lenses. The system eliminates the black pupil/iris blur disadvantages associated with conventional telescopic lens systems and may be provided in a very compact form.

20 Claims, 11 Drawing Sheets

(56) References Cited

U.S. PATENT DOCUMENTS

| | | | |
|---|---|---|---|
| 8,965,193 B1* | 2/2015 | Svec | G02B 17/0808 359/731 |
| 9,405,118 B1 | 8/2016 | Lu | |
| 2012/0050890 A1* | 3/2012 | Kadkly | G02B 19/0085 359/729 |
| 2012/0224386 A1* | 9/2012 | DeWitt | G02B 17/086 359/730 |
| 2013/0329283 A1* | 12/2013 | Nakano | G02B 17/084 359/731 |
| 2015/0116569 A1 | 4/2015 | Mercado | |

* cited by examiner

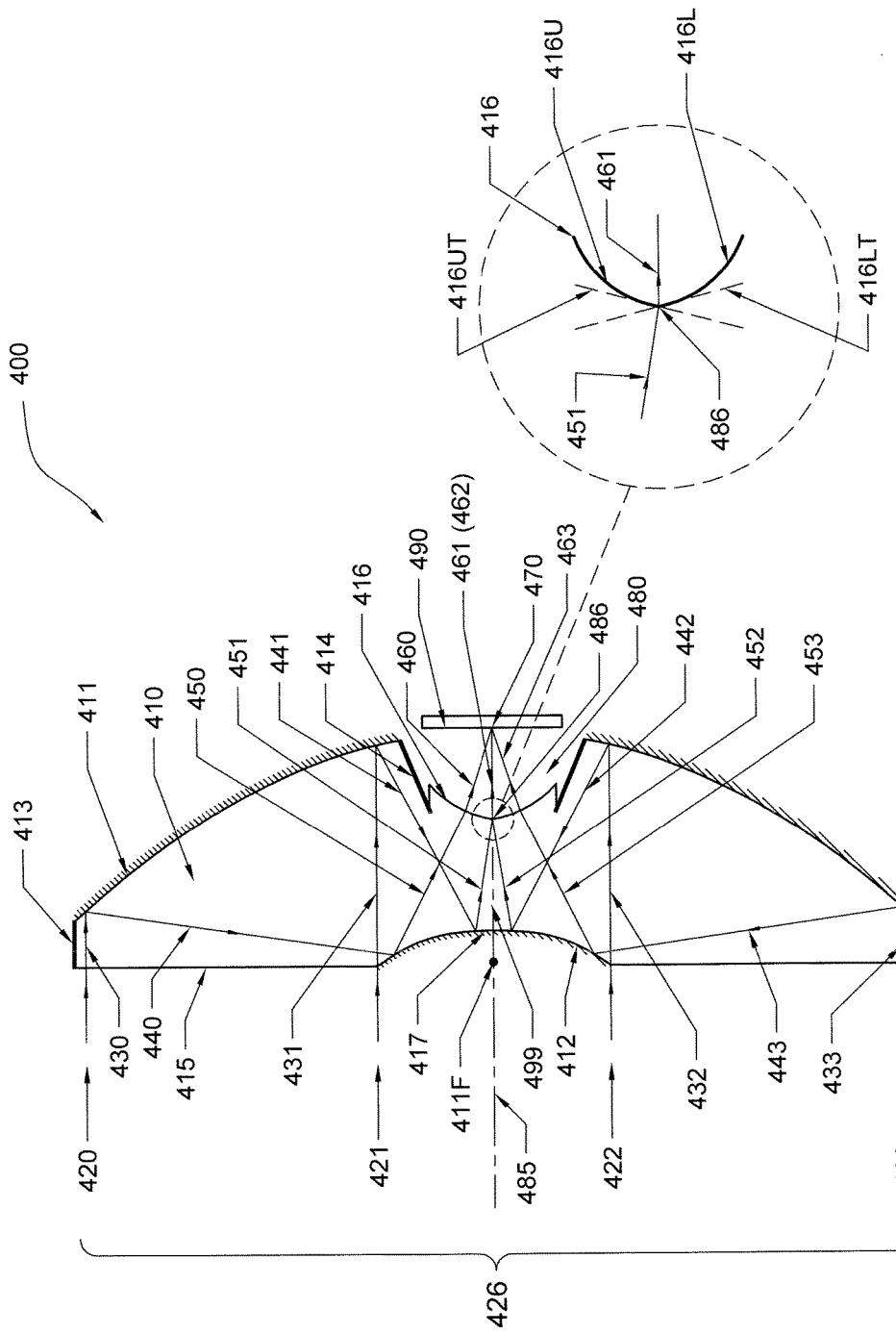

COMPACT CATADIOPTRIC LENSES AND LENS SYSTEMS WITH IMPROVED IMAGE QUALITY AND METHODS OF USING SAME

CROSS REFERENCE TO RELATED APPLICATIONS

The present application claims priority from U.S. Provisional Patent Application No. 62/383,587 filed Sep. 5, 2016, 62/449,097 filed Jan. 22, 2017, and 62/459,570 filed Feb. 15, 2017. The entire disclosures of these prior applications are incorporated herein by reference.

BACKGROUND OF THE INVENTION

Field of the Invention

The present invention relates to compact catadioptric lenses and lens systems with improved image quality, and methods of using same. More particularly, the present invention relates to such systems which solve a problem known as "black pupil" or "iris blur problem" conventionally associated with such lenses and lens systems for improved image quality, and also provides some useful applications for the lenses and lens systems.

Description of the Background Art

A catadioptric optical system is one where refraction and reflection are combined in an optical system, e.g., a typical catadioptric system combines vialenses (dioptrics) and curved mirrors (catoptrics). An example of a typical catoptrics (reflective only) lens system is a Cassegrain-type telescope which includes a primary mirror to collect and reflect incident light rays and a secondary mirror to reflect the collected light rays to exit. By adding dioptric (refractive only) lenses such as Schimidt correction lens in front or extra lenses after for chromatic correction, to the catoptrics (reflective only) lens system the result is a catadioptric optical system. Catadioptric optical systems are popular now, e.g., as a type of telephoto lens system.

In all conventional on-axis, catadioptric lenses and lens systems, there are a primary mirror to collect incident light rays and a secondary mirror to reflect the collected light rays to an exit of the lens or lens system. The secondary mirror is typically disposed in the center of an incident light aperture of the primary mirror, whereby the secondary mirror physically obstructs a center part entrance of the incident light rays. When a catadioptric lens or lens system is off focusing or in afocal, an exit image shows a doughnut-shaped pattern, called an iris blur. The center of the iris, which is a black pupil or black spot, blocks some image, corresponding to the shape of the secondary mirror within the aperture of the primary mirror. This severely degrades quality of an image when in off focusing or afocal setting. It causes little darkness in the center of an image when in near distance. The black pupil effect is an unsolved problem in the conventional catadioptric lenses and lens systems. The black pupil effect can be easily confirmed by looking at the secondary mirror from exit side of any mirror lens system, e.g., your face is reflected by a small mirror area in the center of the secondary mirror. Following is a discussion of some known catadioptric lenses/lens systems.

U.S. Pat. No. 7,843,650 to William Roberts discloses a typical 2-piece Cassegrain mirror lens in one monolithic construction designed for telescope applications. Since it uses a parabolic secondary mirror to reflect collimated light rays to exit, it has a black pupil in the center of an image. The reference never addresses the black pupil/iris blur problem, however, because it is designed for telescope application where the black pupil effect is not much of an issue.

U.S. Pat. No. 4,759,761 to Vladimir Portnoy discloses a small Cassegrain type monolithic mirror lens which conventionally suffers from the black pupil problem, but the reference does not address the black pupil problem or provide any proposal for overcoming same.

U.S. Pat. No. 4,714,307 to John Palmer on Dec. 22, 1987 discloses a system involving a group of lenses between primary and secondary mirrors to differentiate wavelength light rays and another group of lenses after the secondary mirror to separate different wavelength light rays. Again, this reference never addresses nor prevents the iris blur problem.

U.S. Pat. No. 4,666,259 to Yutaka Iizuka discloses a system including a group of negative lens after Cassegrain type mirror lens to minimize chromatic aberration. Again, this reference never addresses nor prevents the iris blur problem.

U.S. Pat. No. 2,726,574 to W. Mandler discloses a typical 2-piece Cassegrain mirror lens with correction lenses before the aperture and after the lens Again, this reference never addresses nor prevents the iris blur problem.

US Patent Application No. 2015/0116569 to Mercado and U.S. Pat. No. 7,826,151 to Tsung-Han Tsai disclose lens systems including arrangements of multiple lenses for making an image sensed by sensors associated with the system appear larger than the respective incidental light apertures of the systems, and thereby achieve higher resolutions. Of course, the addition of additional lenses does, however, make the systems more complicated. The disclosures of the Mercasdo and Tsung-Han Tsai references are incorporated herein by reference.

Thus, while catadioptric lenses and lens systems are known and popular today, the black pupil/iris blur problem still remains a problem for such lenses and lens systems. Hence, there is a need for a catadioptric lenses and lens systems which overcomes the black pupil/iris blur problem for improved image quality, as well as for such a lens/lens system which is structurally non-complicated, can be economically manufactured, and can be provided in very compact sizes.

SUMMARY OF THE INVENTION

It is an aspect and object of the present invention to provide improved catadioptric lenses and lens systems which satisfies the discussed need.

According to a first aspect of the present invention, an on-axis catadioptric lens system comprises a unitary optical member formed of a material having a positive refractive index, wherein the optical member includes: a plano surface which receives incident light therethrough; a first curved surface having a reflective coating provided thereon which receives the incident light after it passes through the plano surface and compresses and redirects the incident light toward a focal point of the coated first curved surface; a recess extending inward of the optical member at a center portion of the coated first curved surface; a second curved surface having a reflective coating provided thereon which is disposed between the coated first curved surface and the focal point of the coated first curved surface, which receives the light redirected by the coated first curved surface, and further redirects the same toward a focal target of the coated second curved surface; an uncoated third curved surface at a center portion of the coated second curved surface, and which receives and redirects other incident light toward the focal target of the coated second curved surface; and an uncoated fourth curved surface provided at a center of the recess, which receives the light redirected by the coated second curved surface and the light redirected by the uncoated third curved surface, and redirects the same outward of the optical member through the recess. The uncoated third curved surface may have magnification and focal ratios which are the same as magnification and focal ratios of the coated second curved surface. An exemplary embodiment according to the first aspect of the invention is shown in FIG. 1.

Such catadioptric lens system according to the first aspect of the present invention is also a telephoto lens system which essentially combines aspects of a reflective telescope (the first and second curved surfaces having a reflective coating provided thereon) with a aspects of a refractive telescope (the uncoated third and uncoated fourth curved surfaces). It receives light rays in a parallel path of a reflective telescope and a refractive telescope, and with all the advantages of the catadioptric lens system. It is effective to overcome the black pupil/iris blur problem because the uncoated third curved surface transmits the other incident light toward the focal target of the coated second curved surface that would otherwise be blocked by the coated second curved surface if the coated second curved surface had no opening defined therein. In this regard, the other incident light which is redirected by the uncoated third curved surface and passes through the opening in the center portion of the coated second curved surface becomes combined with the incident light that is compressed and redirected by the coated second curved surface with no voids therebetween, even though some incident light entering the lens system may still be blocked by the coated second curved surface. The system prevents voids between the light redirected by the uncoated third curved surface and the light redirected by coated second curved surface because all of such light is directed toward the focal target of the coated second curved surface, and because the coated second curved surface fully surrounds the opening in the center portion thereof so that light reflected by the portion of the coated second curved surface which is directly adjacent to the opening appears fully consistent with the light passing through the opening. Also, because the uncoated third curved surface in the center portion of the coated second curved surface has magnification and focal ratios which are the same as magnification and focal ratios of the coated second curved surface, and because the coated first curved surface may have a shape which redirects all of the incident light thereon towards the coated second curved surface, such features of the system according to the present invention help to avoid any blurring or the like so that the lens system provides a high quality output with little or no blurring.

Additionally, the catadioptric lens system according to the first aspect of the present invention can be constructed in a very small/compact size because all of the features are combined in a monolithic form, i.e., the unitary optical member. For example, if the coated first curved surface and the plano surface are disposed opposite to each other and form outer surfaces of the optical member, a thickness of the optical member between these two surfaces may be as little as ¼ of a diameter of the plano surface. Hence, it can be provided in a very small thickness suitable for use with a built-in camera of a smart phone or similar device, either as an internal component or an aftermarket component which may be used together with the built-in camera of a smart phone or similar device.

Further, a sidewall of the recess at the center of the coated first curved surface and an outer circumferential surface of the optical member extending between the plano surface and the coated first curved surface may each be provided with a light barrier treatment, such as coating of a light barrier material or a sleeve of light barrier material fitted thereto. Such light barrier treatment will block any unwanted light rays from passing through the treated surfaces and from being combined with the light rays being redirected by the uncoated fourth curved surface outward of the optical member through the recess, and prevent any such unwanted light rays from reducing the image quality of the light that is redirected by the uncoated fourth curved surface to outside of the optical member. For example, unwanted light rays include those which are incident on the plano surface at an angle other than 90° and which pass directly through the optical member toward the sidewall of the recess at the center of the coated first curved surface (see light ray 128 in the exemplary embodiment shown in FIG. 1 of the present application).

Still further, because the uncoated fourth curved surface redirects the received light rays to outside of the optical member, the specific curvature of the uncoated fourth curved surface may be selected to output the light in various manners. For example, the uncoated fourth curved surface may have a curvature whereby it outputs the received light rays to a focal target of the coated second curved surface outside of the optical member, but which is closely adjacent to the optical member, such as in the exemplary embodiment shown in present FIG. 1. Such a curvature would be appropriate if the optical member is to function as a standalone telephoto lens system provided as an original component of a smart phone or the like device. As another example, the uncoated fourth curved surface may have a curvature whereby it outputs the received light rays in a collimated manner essentially parallel to the incident light passing through the plano surface member, such as in the exemplary embodiment shown in present FIG. 2. Such a curvature would be appropriate if the optical member is to function as an add-on telephoto lens system to a smart phone or the like, which functions in conjunction with a standard lens originally provided with the smart phone or like device, e.g., the collimated light output by the optical member would pass through the standard lens and be directed toward a focal point of the standard lens. Also, the recess which extends inward of the optical member continuously from a center of the coated first curved surface provides a convenient space for disposing other lenses and other devices that cooperate with the catadioptric lens system, without having to provide additional, separate space for such other lenses and other devices, e.g., such as in the exemplary embodiment shown in present FIG. 10.

Although the uncoated third curved surface in the catadioptric lens system according to the first aspect of the present invention is limited to an outer circumferential dimension which cannot be any larger than the opening defined at the center portion of the coated second curved surface, such that some incident light will be blocked by the coated second curved surface, it is possible to modify the catadioptric lens system of the present invention so that no incident light is blocked by the coated second curved surface.

According to a second aspect of the present invention there is provided such a catadioptric lens system in which none of the incident light entering an aperture of the system is blocked. An exemplary embodiment of a catadioptric lens system according to the second aspect of the present invention is shown in FIG. 3 and it is essentially a modification of the lens system according to the first aspect of the present invention. Such catadioptric lens system according to the second aspect may still include a unitary optical member including a plano surface which receives incident light therethrough and first-fourth curved surfaces similar to the optical member according the first aspect of the present invention. However, the coated second curved surface will not be disposed at a center portion of the plano surface, but may be disposed internally of the optical member spaced from the plano surface, and the optical member may further comprise an uncoated fifth curved surface which extends continuously from the plano surface as a projection at a center of the plano surface, and an uncoated sixth curved surface disposed between the uncoated fifth curved and the coated second curved surface, and which functions together with the uncoated fifth curved surface to redirect other incident light rays through the uncoated third curved surface. The uncoated fifth curved surface may have an outer circumferential dimension which is larger than that of the coated second curved surface because it does not extend continuously from the coated second curved surface. Compare the exemplary embodiments of the present invention shown in FIG. 1 or 2 to the exemplary embodiment of the present invention shown in FIG. 3. If the uncoated fifth curved surface has an outer circumferential dimension which is larger than that of the coated second curved surface all of the other incident light which would have been blocked by the coated second curved surface can be directed by uncoated the fifth curved surface to and through the uncoated third curved surface in the center portion of the coated second curved surface so that the lens system provides a higher quality image that that achieved with the catadioptric lens system according to the first aspect of the present invention. Such catadioptric lens system according to the second aspect of the present invention also achieves all of the advantages achieved by the catadioptric lens system according to the first aspect of the present invention, but the unitary optical member in the modified system would have a larger size/thickness than that of the unmodified unitary optical member because the coated second curved surface is spaced from the plano surface.

According to a third aspect of the present invention, an on-axis catadioptric lens system comprises a unitary optical member formed of a material having a positive refractive index, wherein the optical member includes: a plano surface which receives incident light therethrough; a first curved surface having a reflective coating provided thereon which receives the incident light after it passes through the plano surface and compresses and redirects the incident light toward a focal point of the coated first curved surface; a recess defined at a center portion of the coated first curved surface, which recess extends inward of the unitary optical member; a second curved surface having a reflective coating provided thereon which is disposed between the coated first curved surface and the focal point of the coated first curved surface, which receives the light redirected by the coated first curved surface and further redirects the same toward a focal target of the coated second curved surface; and an uncoated third curved surface provided at a center of the recess, the uncoated third curved surface receives the light redirected by the coated second curved surface and redirects said received lights through the recess to outside of the optical member; wherein the uncoated third curved surface is curved and conical with a point surface at a center thereof.

Additionally, in the lens system according to the third aspect of the present invention: the coated first curved surface may be concave, the coated second curved surface may be convex and the uncoated third curved surface may be concave and conical; the coated second curved surface may extend continuously from the plano surface as another recess into the optical member at a center of the plano surface; the coated second curved surface may extend continuously with no opening defined therein; a side wall of the recess and an outer circumferential surface of the optical member extending between the plano surface and the coated first curved surface may be treated with a light barrier treatment such as discussed above in relation to the lens system according to the first aspect of the present invention. An exemplary embodiment according to the third aspect of the present invention is shown in FIG. 4.

With such catadioptric lens system according to the third aspect of the present invention the black pupil/iris blur problem is overcome even though the coated second curved surface has no opening defined therein and hence blocks some of the incident entering the system. This is possible because the point surface of the uncoated third curved and conical surface redirects the light rays such that the redirected light rays overlap each other, whereby there are no voids, even though some incident light is blocked by the coated second curved surface. Therefore, the system according to the third aspect of the present invention also helps to avoid any blurring or the like so that the lens system provides a high quality clear output. Additionally, the catadioptric lens system according to the third aspect of the present invention can be constructed in a very small/compact size because all of the features are combined in a monolithic form, i.e., the unitary optical member.

According to a fourth aspect of the present invention, an on-axis catadioptric lens system comprises a unitary optical member formed of a material having a positive refractive index, wherein the optical member includes: a plano surface which receives incident light therethrough; a first curved surface having a reflective coating provided thereon which receives the incident light after it passes through the plano surface and compresses and redirects the incident light toward a focal point of the coated first curved surface; a recess defined at a center portion of the coated first curved surface having and extending inward of the unitary optical member; a second curved surface having a reflective coating provided thereon which is disposed between the coated first curved surface and the focal point of the coated first curved surface, which receives the light redirected by the coated first curved surface and further redirects the same toward a focal target of the coated second curved surface; and an uncoated third curved surface provided at a center of the recess, which uncoated third curved surface receives the light redirected by the coated second curved surface and redirects said received light to outside of the optical member; wherein the coated second curved surface is curved and conical with a point surface at a center thereof.

Additionally, the coated first curved surface may be concave and the coated second curved surface may be convex and conical, the coated second curved surface may extend continuously from the plano surface as another recess into the optical member at a center of the plano surface, the coated second surface may extend continuously with no opening defined therein, and a side wall of the recess at the center of the coated first curved surface and an outer circumferential surface of the optical member extending between the plano surface and the coated first curved surface may be treated with a light barrier treatment such as discussed above in relation to the lens system according to the first aspect of the present invention. An exemplary embodiment of a lens system according to the fourth aspect of the present invention is shown in FIG. 5.

With such catadioptric lens system according to the fourth aspect of the present invention the black pupil/iris blur problem is overcome even though the coated second curved and conical surface has no opening defined therein and hence blocks some of the incident entering the system. This is possible because the point surface of the coated second curved and conical surface redirects the light rays such that the redirected light rays overlap each other, whereby there are no voids in the light redirected by the lens, even though some incident light is blocked by the coated second curved and conical surface. Therefore, the system according to the fourth aspect of the present invention help to avoid any blurring or the like so that the lens system provides a high quality clear output. Additionally, the catadioptric lens system according to the fourth aspect of the present invention can be constructed in a very small/compact size because all of the features are combined in a monolithic form, i.e., the unitary optical member. The catadioptric lens system according to the fourth aspect of the present invention is very similar to the catadioptric lens system according to the third aspect of the present invention except that the coated second curved surface in the fourth aspect is also conical in shape with a point surface at a center thereof, whereas in the system according to the third aspect, the uncoated third curved surface is also conical in shape with a point surface at a center thereof. Compare the exemplary embodiments in FIGS. 4, 5 herein.

According to a fifth aspect of the present invention there is provided an on-axis catadioptric lens system comprising: a first reflective curved surface which receives incident light and compresses and redirects the incident light toward a focal point of the first reflective curved surface, the first reflective curved surface having an opening defined at a center portion thereof through which light may pass without being reflected; a second reflective curved surface which is disposed between the first reflective curved surface and the focal point of the first reflective curved surface, which receives the light redirected by the first reflective curved surface and further redirects the same toward the opening in the center portion of the first reflective curved surface and toward a focal target of the second reflective curved surface, and which has an opening defined at a center portion thereof through which other incident light may pass without being reflected; a first lens provided adjacent the opening in the second reflective curved surface and which directs the other incident light that passes through the opening at the center portion of the second reflective curved surface toward the focal target of the second reflective curved surface; and a second lens which is disposed closer to the first reflective curved surface than is the first lens, and which redirects the incident light from the second reflective curved surface and receives the light which has passed through the first lens and redirects same toward the focal target of the second reflective surface.

Such catadioptric lens system according to the fifth aspect of the present invention is essentially a telephoto lens system which combines aspects of a reflective telescope (the first and second reflective curved surfaces) with a aspects of a refractive telescope (the first and second lenses) in parallel, and is effective for overcoming the black pupil/iris blur problem because the first and second lenses transmit the other incident light toward the focal target of the second reflective curved surface that would otherwise be blocked by the second reflective curved surface if the second reflective curved surface had no opening defined therein. In this regard, the first lens may have an outer circumferential size which is smaller than that of the second reflective curved surface, such as the lens 618 and the second reflective curved surface 612 in the exemplary embodiment of FIG. 6 of the present application, and still be appropriate for overcoming the black pupil/iris blur problem because the incident light which passes through the opening in the center portion of the second reflective surface and is redirected by the first and second lenses becomes combined with the incident light that is compressed and redirected by the second reflective curved surface with no voids therebetween, even though some incident light entering the lens system may still be blocked by the second reflective curved surface. The system prevents voids between the light redirected by the first and second lenses and the light redirected by the second reflective curved surface because all of such light is directed toward the focal target of the second reflective surface, and because the second reflective curved surface fully surrounds the opening in the center portion thereof so that light reflected by the portion of the second reflective curved surface which is directly adjacent to the opening appears fully consistent with the light passing through the opening. Also, because the first lens has magnification and focal ratios which are the same as magnification and focal ratios of the second reflective curved surface, and because the first reflective curved surface may have a shape which redirects all of the incident light thereon towards the second reflective curved surface, such features of the system according to the present invention help to avoid any blurring or the like so that the lens system provides a high quality output with little or no blurring.

While some incident light entering the lens system may be blocked by the second reflective curved surface in the catadioptric lens system according to the fifth aspect of the present invention, it is possible to modify such catadioptric lens system such that no incident light is blocked by the second reflective curved surface, and thereby achieve an improved image quality. For example, FIG. 6 herein presents one exemplary embodiment of a catadioptric lens system according to the fifth aspect of the present invention in which the second lens 619 is disposed between the first and second reflective curved surfaces 611, 612 such that the second lens 619 receives the light which has been redirected by the first lens 618 and the light which has been redirected by the second reflective curved surface and further redirects all of the light toward the opening in the center portion of the first reflective curved surface. With this arrangement, the first lens 618 may be limited to a size which is smaller than that of the second reflective curved surface 612, so that some of the incident light entering the lens system will be blocked by the second reflective curved surface, but this embodiment is still effective for overcoming the black pupil/iris blur problem as discussed above.

With reference to the exemplary embodiment in FIG. 7, however, another exemplary embodiment according to a sixth aspect of the present invention is disclosed in which the arrangement and structure of first and second lenses 718, 719 is changed in comparison to the arrangement and structure of the first and second lenses 618, 619 in the embodiment of FIG. 6 so that no incident light which enters the system is blocked by the second reflective curved surface 712. In the embodiment of FIG. 7 the second lens 719 is disposed further away from the first reflective curved surface 711 than is the first lens 718, and the second lens has an outer circumference which is slightly larger than the outer circumference of the second reflective curved surface 712. Thus, the second lens can compress and redirect all of the other incident light that would have been blocked by the second reflective curved surface toward the first lens 718, which then redirects the light through the opening in the center portion of the second reflective curved surface.

According to a seventh aspect of the present invention there is provided an on-axis catadioptric lens system comprising: a first reflective curved surface which receives incident light compresses and redirects the incident light toward a focal point of the first reflective curved surface, the first reflective curved surface have an opening defined at a center portion thereof; a second reflective curved surface which is disposed between the first reflective curved surface and the focal point of the first reflective curved surface, which receives the light redirected by the first reflective curved surface and further redirects the same toward the opening defined at the center portion of the first reflective curved surface; and a conical lens disposed adjacent to the opening defined at the center portion of the first reflective curved surface which receives the light redirected by the second reflective curved surface and directs the received light outside of the lens system; wherein one of a light-receiving surface and a light-exiting surface of the conical lens is conical in shape with a point surface at a center thereof and the other of said surfaces of the lens is curved; and the point surface redirects light rays which are directed to the point surface such that the redirected light rays overlap each other.

Additionally, the first reflective curved surface may be concave and the second reflective curved surface may be convex, the second reflective surface may extend continuously with no opening defined therein, the curved surface of the lens may be concave or convex, and the an on-axis catadioptric lens system may further comprise a housing formed of light blocking material which surrounds the other components, has one end which is closed by the first reflective curved surface other than at the opening defined at the center portion of the first reflective curved surface, and has an opposite end which is open so that incident light may pass therethrough toward the first reflective curved surface. An exemplary embodiment according to the seventh aspect of the invention is shown in FIG. 8.

With such catadioptric lens system according to the seventh aspect of the present invention the black pupil/iris blur problem is overcome even though the second reflective surface has no opening defined therein and hence blocks some of the incident entering the system. This is possible because the point surface of the conical lens redirects the light rays such that the redirected light rays overlap each other, whereby there are no voids in the light as redirected by the lens, even though some incident light is blocked by the second reflective curved surface. Therefore, the system according to the seventh aspect of the present invention help to avoid any blurring or the like so that the lens system provides a high quality clear output.

According to an eighth aspect of the present invention there is provided an on-axis catadioptric lens system comprising: a first reflective curved surface which receives incident light compresses and redirects the incident light toward a focal point of the first reflective curved surface, the first reflective curved surface having an opening defined at a center portion thereof; and a second reflective curved surface which is disposed between the first reflective curved surface and the focal point of the first reflective curved surface, which receives the light redirected by the first reflective curved surface and further compresses the light through the opening defined at the center portion of the first reflective curved surface; wherein the second reflective surface is curved and conical with a point surface at a center thereof; and the point surface of curved and conical shaped surface overlaps light rays which are directed to the point surface by the first reflective curved surface. Additionally, the second reflective surface has no opening defined through any portion thereof. An exemplary embodiment according to the eighth aspect of the present invention is shown in FIG. 9.

With such catadioptric lens system according to the eighth aspect of the present invention the black pupil/iris blur problem is overcome even though the second reflective surface has no opening defined therein and hence blocks light incident on a back (non-reflective) surface thereof, because the point surface of the curved and conical second reflective surface overlaps the light rays which are directed to the point surface by the first reflective curved surface, whereby any void in the incident light caused because some incident light is blocked by the second reflective curved surface is effectively eliminated by the overlapped light rays, while the concave and conical nature of second reflective surface otherwise provides a high quality image of the redirected light rays. The catadioptric lens system according to the eighth aspect of the present invention is similar to the catadioptric lens system according to the fourth aspect of the present invention, except that the system according to the eighth aspect is more simple in structure in that it only includes the first and second reflective surfaces. Compare the exemplary embodiments of the present invention as shown in FIGS. 5, 9.

For a more complete understanding of the present invention, the reader is referred to the following detailed description section, which should be read in conjunction with the accompanying drawings showing present embodiments of the invention. Throughout the following detailed description and in the drawings, like numbers refer to like parts.

Intent of Disclosure

Although the following disclosure offered for public dissemination is detailed to ensure adequacy and aid in understanding of the invention, this is not intended to prejudice that purpose of a patent which is to cover each new inventive concept therein no matter how it may later be disguised by variations in form or additions of further improvements. The claims at the end hereof are the chief aid toward this purpose, as it is these that meet the requirement of pointing out the improvements, combinations and methods in which the inventive concepts are found.

There have been chosen specific exemplary embodiments of a catadioptric lens system according to the present invention, as well as some alternative structures and modifications thereto. The exemplary embodiments chosen for the purposes of illustration and description of the structure and method of the invention are shown in the accompanying drawings forming a part of the specification.

BRIEF DESCRIPTION OF THE DRAWINGS

FIG. 4 is a side, cross sectional view of a catadioptric lens system according to a third illustrative embodiment of the present invention.

FIG. 4A is an enlargement of a portion of the embodiment of FIG. 4.

DETAILED DESCRIPTION OF THE PRESENT ILLUSTRATIVE EMBODIMENTS

A number of selected illustrative embodiments of the invention will now be described in detail, with reference to the drawings. It should be understood that only structures considered necessary for clarifying the present invention are described herein. Other conventional structures, and those of ancillary and auxiliary components of the system, are known and understood by those skilled in the art. These illustrative embodiments are catadioptric lens system and various components of such systems. Like components in various embodiments will be described with like or similar reference numbers.

The exemplary embodiments of a catadioptric lens system according to the present invention as shown in FIGS. 1-5 and 10 are each in the form of a unitary optical member, in other words a monolithic member, which may be made of transparent optical material with a positive refractive index such as acrylic or glass, which may be generally disc shaped or partial spherical shaped, and wherein certain surfaces thereof may be coated with a reflective coating or a light blocking coating such as discussed below. On the other hand, the exemplary embodiments of a catadioptric lens system according to the present invention as shown in FIGS. 6-9 and 11 are each in the form of discrete structures with multiple separate components that are joined together to achieve essentially the same or very similar functions as the systems of FIGS. 1-5 and 10.

Further, various ones of the monolithic member systems of the present invention function similarly to various ones of the discrete structure systems according to the present invention. For example, the exemplary embodiments of a catadioptric lens system according to the present invention as shown in FIGS. 1-3 and 6-7 each receive incident light rays in a parallel path of both catoptrics and dioptrics, where some of the incident light rays go through a reflective path involving mirrors/reflective surfaces and others of the incident light rays go through a refractive path involving lenses. On the other hand, the exemplary embodiments of a catadioptric lens system according to the present invention as shown in FIGS. 4-5 and 8-11 each receive incident light rays in a serial path of catoptrics and dioptrics, where all the incident light rays initially go through a reflective path involving mirrors/reflective surfaces and then go through a refractive path involving lenses.

Lens Systems Including Monolithic Member

Figure 1:
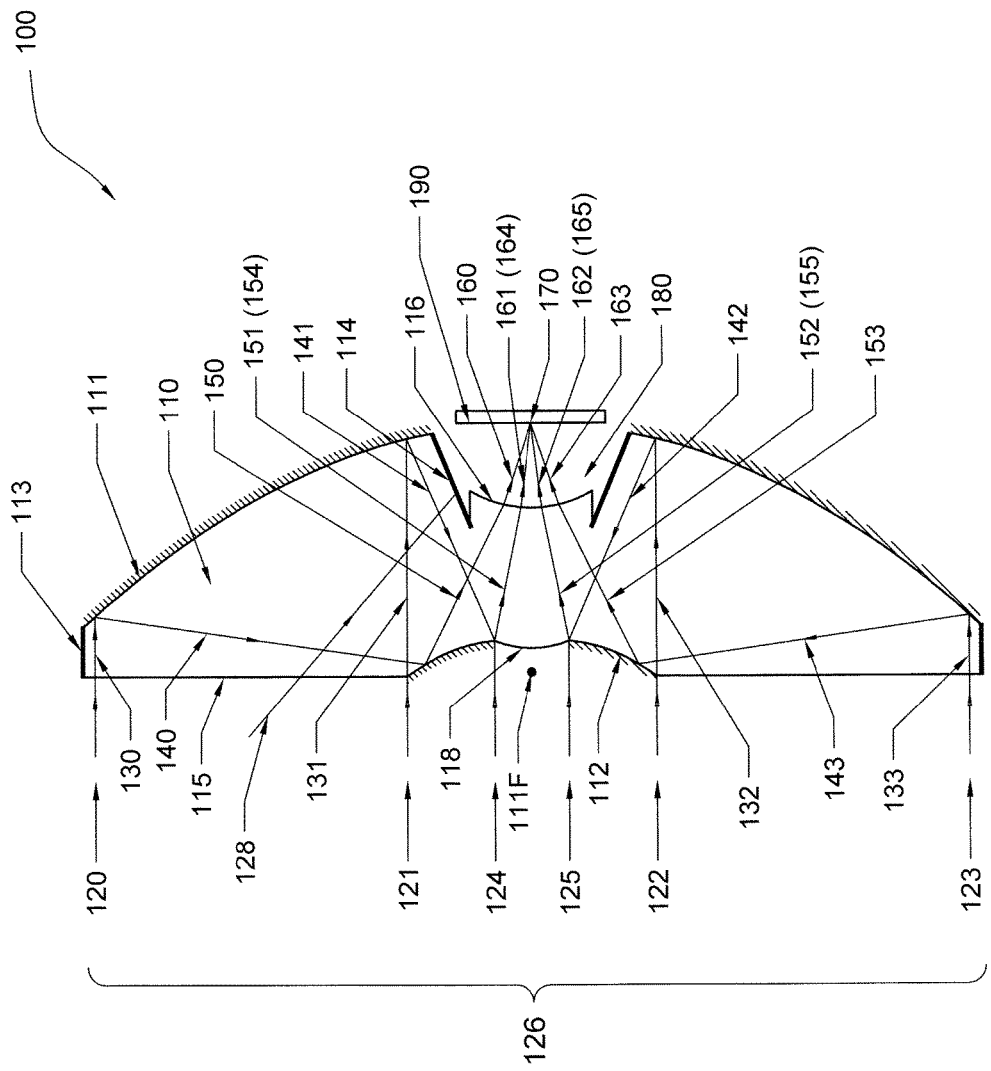
FIG. 1 is a side, cross sectional view of a catadioptric lens system according to a first illustrative embodiment of the present invention.

Referring now to the FIG. 1 there is shown a disc shape focusing catadioptric lens system 100 in side cross sectional view. As depicted, the monolithic member 110 has a doughnut-shaped plano surface 115 which defines an aperture 126 through which incident light enters the member, and a first concave surface which may be coated with a highly/totally reflective coating such as aluminum or silver to define a primary mirror 111. The primary mirror 111 receives incident light that enters the member 110 through the aperture 126, and then compresses and redirects the received light toward a focal point 111F of the primary mirror 111. Further, the primary mirror 111 may have a recess or cavity 180 provided at a center portion thereof which extends inward of the member 110, such that the primary mirror 111 is generally doughnut-shaped or ring-shaped. If the primary mirror 111 is parabolic-shaped with the focal point 111F, then a total thickness of the catadioptric lens will be about ¼ of the diameter of the aperture 126. A second curved surface 112 is provided as a recess at a center portion of the plano surface 115, extends inward of the monolithic member 110 such that it is a convex or hyperbolic surface which is also coated with a highly/totally reflective coating such as aluminum or silver and forms a secondary mirror 112. A third curved surface, convex surface 118, is provided in the center portion of the secondary mirror 112, and is not coated with a highly/totally reflective coating. Thus, the secondary mirror 112 is also generally doughnut-shaped or ring-shaped. The convex surface 118 may have magnification and focal ratios which are the same as magnification and focal ratios of the secondary mirror 112, and the primary mirror 111 may have a shape which redirects all of the incident light thereon towards the secondary mirror 112, including fully up to the inner edge of the secondary mirror 112 which borders with the outer periphery of the convex surface 118. At a center of the recess 180 there is provided a fourth curved (concave) surface 116 which is not coated and defines an exit surface for light rays exiting the member 110. Particularly, the light which is further redirected and possibly further compressed by the secondary mirror 112 and the light which is redirected and possibly further compressed by the convex surface 118 are both directed to the concave surface 116, which then redirects all of the light outside of the member 110 through the recess 180.

When typical incident light rays 120, 121, 124, 125, 122 and 123 shine within the aperture 126 of the plano surface 115 and the convex surface 118, incident light ray 120 enters the plano surface 115 and becomes light ray 130. It is reflected by the primary mirror 111 to become light ray 140 and converges to the secondary mirror 112. It then is reflected to become light ray 150 and further converges towards the concave surface 116 and becomes light ray 160 directed towards a focal target 170 where an image sensor 190 is located. Similarly, light ray 121 becomes 131, then 141, then 151, and finally 161, light ray 122 become 132, then 142, then 152, and finally 162, and light ray 123 become 133, then 143, then 153, and finally 163. Other incident light rays entering the lens system 100 between light rays 124 and 125, inclusive, go through the convex surface 118. Light ray 124 goes through the convex surface 118 and converges to become 154, and according to an important aspect of the present invention the secondary mirror 112 and the convex surface 118 are configured so that the light ray 151 redirected by the secondary mirror 112 will be on the same path as the light ray 154 redirected by the convex surface 118. The light ray 154 exits through the concave surface 116 and diverges to become light ray 164 towards the focal target 170. The concave surface 116 is configured so that the light ray 164 is directed to be same path of the light ray 161. So does light ray 125 becomes 155, then 165.

Although there is some light ray blockage from the secondary mirror 112, all light rays exiting the lens system 100 via the concave surface 116, e.g., the light rays 160, 161 (164), 162 (165), to 163, have no voids therebetween. Since there is no light rays voids at exit, there will be no black pupil/iris blur problem which is a problem for conventional devices.

In the depicted embodiment of FIG. 1 the concave surface 116 is provided as the innermost surface of the recess 180 extending inward of the monolithic member 110 at the center portion of the primary mirror 111, and extends as the concave surface 116 from the inner edge of the sidewall 114 of the recess 180. With such construction the recess 180 provides a convenient space for disposing other lenses and other devices that cooperate with the catadioptric lens system, without having to provide additional, separate space for such other lenses and other devices. For example, such other lenses and devices may include those disclosed in US Patent Application No. US2015/0116569 to Mercado and U.S. Pat. No. 7,826,151 by Tsung-Han Tsai as mentioned above, and a zooming lens 595 included with the modified lens system 500' shown in FIG. 10 which is discussed further below. If there is no need for disposing other lenses and other devices in the recess 180, e.g., if the lens system 100 is to function as an additional telephoto lens system that may be attached to a smart phone or similar device which already includes an internal camera lens system, it is possible to modify the recess 180 and/or the concave surface 116 in various manners. For example, the recess 180 need not extend so deeply into the member 110. As another example the concave surface 116 could project into the recess to various extents, even up to or beyond the primary mirror 111. Just how far the concave surface 116 extends into the recess 180 may be selected as desired for any given application. If the lens system 100 is to function as an internal, original telephoto lens system for a smart phone or the like the recess 180 will typically be desirable for disposing additional lenses or other devices therein.

An edge circular surface band 113 extending between the outer peripheral edges of the plano surface 115 and the primary mirror 111 may be treated with a barrier treatment that does not permit light to pass therethrough and does not reflect light, such as a black coating including a carbon based material applied to the surface band 113 or a light-blocking, non-reflective sleeve adhered to the surface band 113. This treatment blocks unwanted light rays from entering the lens system 100 similar to an outer housing on a conventional telescope or telephoto lens. Similarly, a surface of the side wall 114 of the recess 180 may be treated with such a barrier treatment that does not permit light to pass therethrough and does not reflect light. There are some unwanted light rays entering the aperture 126, one example of which is shown at light ray 128 which enters the aperture 126 and is directed toward the recess 180 rather than to the primary mirror 111, but these unwanted light rays are blocked by the light barrier treatment on the side wall 114. The treated surface band 113 and treated side wall 114 function to block unwanted incident light rays that would reduce the focus/quality of the light being compressed and redirected through the member 110.

The primary mirror 111 and the secondary mirror 112 form a typical Cassegrain mirror lens, a type of reflective telephoto lens, while the convex third curved surface 118 along with the concave surface 116 form a typical refractive telescope. The lens system 100 receives incident light rays in a parallel path of catoptrics and dioptrics. The catadioptric lens system 100 comprising the monolithic member 110 combines these reflective and refractive telescopic qualities, and is effective for overcoming the black pupil/iris blur problem because the concave surface 118 and convex surface 116 transmit incident light toward the focal target of the secondary mirror 112 that would otherwise be blocked by the secondary mirror 112 if the secondary mirror had no opening defined therein. In this regard, the convex surface 118 has an outer circumferential size which is smaller than that of the secondary mirror 112, but is still appropriate for overcoming the black pupil/iris blur problem because the other incident light which passes through the convex surface 118, while being redirected and possibly compressed thereby, is received by the concave surface 116 which then combines such light with the incident light that is redirected and possibly compressed by the secondary mirror 112 with no voids therebetween, even though some incident light entering the lens system may still be blocked by the secondary mirror 112. The system 100 prevents voids between the light redirected by the convex surface 118 and the light redirected by the secondary mirror 112 because all of such light is directed toward the focal target of the secondary mirror 112, and because the secondary mirror 112 fully surrounds the convex surface 118 so that light reflected by the portion of the secondary mirror 112 which is directly adjacent to the convex surface 118 appears fully consistent with the light passing through the convex surface 118. Also, if the convex surface 118 has magnification and focal ratios which are the same as magnification and focal ratios of the secondary mirror 112, and if the primary mirror 111 has a shape which redirects all of the incident light thereon towards the secondary mirror 112, the system 100 according to the present invention not only overcomes black pupil/iris blur drawbacks discussed above, but the lens system according to the present invention provides a high quality output with both sharpness and brightness even though some of the incident light entering the system is blocked by the secondary mirror 112.

Additionally, the catadioptric lens system 100 can be constructed in a very small/compact size because all of the features are combined in a monolithic form, i.e., the unitary optical member 110. For example, because the primary mirror 111 and the plano surface 115 are disposed opposite to each other and form outer surfaces of the optical member, a thickness of the optical member between these two surfaces may be as little as ¼ of a diameter of the plano surface. Hence, the system can be provided in a very small thickness suitable for use with a built-in camera of a smart phone or similar device, either as an internal component or an aftermarket component which may be used together with the built-in camera of a smart phone or similar device. If the lens system 100 is to be used as a standalone lens system forming an internal component of a smart phone or the like, the concave surface 116 may redirect light to a focal target 170, and an image sensor 190 may be disposed at the focal target 170 as shown in FIG. 1.

Given that the concave surface 116 redirects the received light rays to outside of the optical member, the specific curvature of the concave surface 116 may be selected to output the light in various manners. For example, the concave surface 116 may have a curvature whereby it outputs the received light rays to a focal target outside of the optical member 110, but which is closely adjacent to the optical member 110, such as in the exemplary embodiment shown in present FIG. 1. Such a curvature would be appropriate if the optical member 110 is to function as a stand-alone telephoto lens system provided as an original component of a smart phone or the like device.

Figure 2:
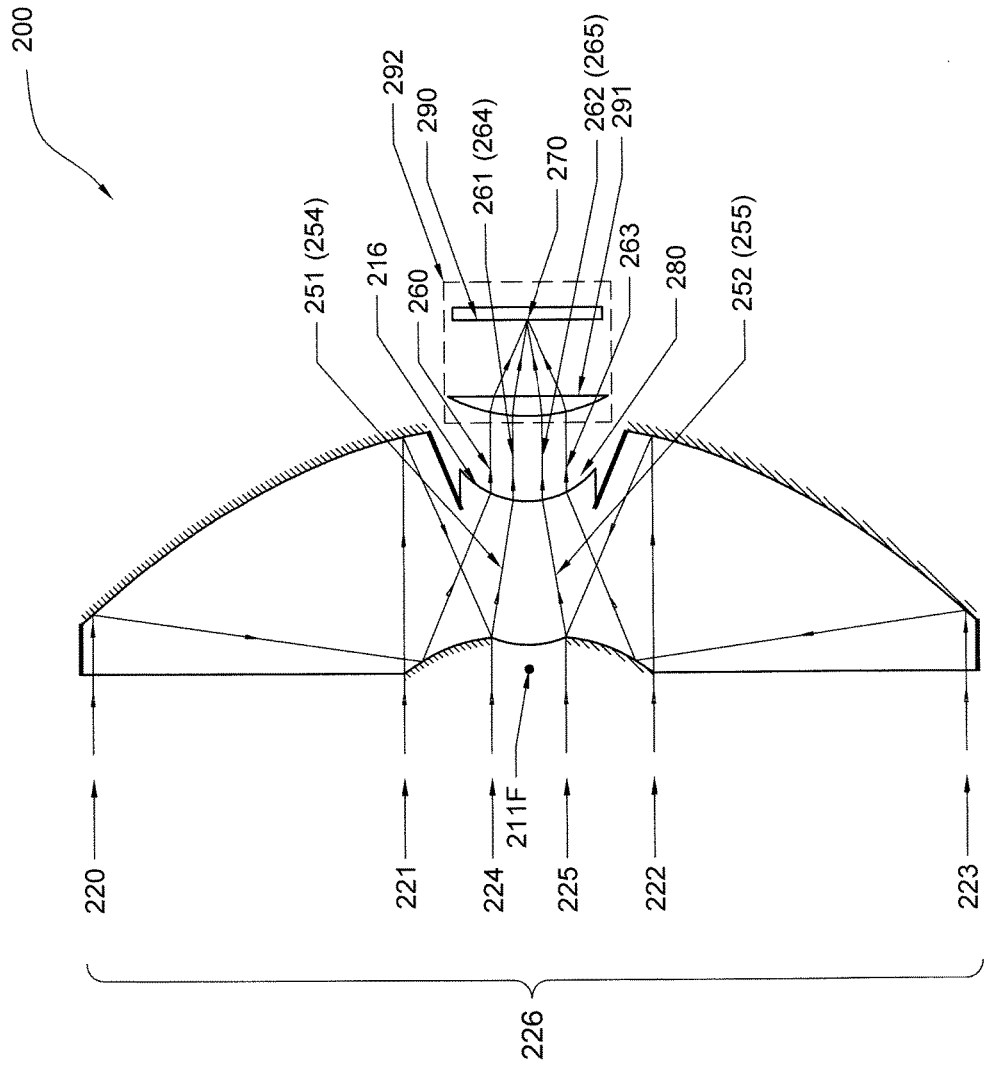
FIG. 2 is a side, cross sectional view of a modified version of the catadioptric lens system of FIG. 1.

As another example, the concave surface 116 may have a curvature whereby it outputs the received light rays in an afocal or collimated manner essentially parallel to the incident light passing through the plano surface 115, such as a concave surface 216 in the lens system 200 according to the exemplary embodiment shown in present FIG. 2. As can be recognized from comparison of the lens systems 100, 200 respectively shown in FIGS. 1, 2 the concave surface 216 has a larger degree of curvature than the concave surface 116 in the system 100 of FIG. 1. All other aspects of the lens system 200 in FIG. 2 are the same as the lens system 100 of FIG. 1, and the system 200 of FIG. 2 achieves all of the advantages achieved by the system 100 in FIG. 1. In the system 200 of FIG. 2 the collimated light rays 260-265 may be received by another lens 291 external to the lens system 200, such as conventional camera lens provided in a smart phone or the like, which then compresses and redirects the light to a focal target 270 of the lens 291 and an image sensor 290 provided at the focal target 270. The lens 291 and image sensor 290 correspond to a single lens camera system 292 conventionally provided with a smart phone or the like. As used herein the term "focal target" is intended to encompass any desired pattern of light rays redirected or output by any of the curved surfaces of the monolithic member included in an on-axis catadioptric lens systems according to the present invention. For example, this encompasses a focal point such as shown at 170 in FIG. 1 of the concave surface 116 of the member 110 and a larger, afocal circular pattern of parallel light rays of the of the concave surface 216 of the member 210 in the in the lens system 200 according to the exemplary embodiment shown in present FIG. 2.

The plano surface 115 can be made to an aspheric surface to correct any spherical aberration if the primary mirror 111 is spherical. If the primary mirror 111 is parabolic-shaped, any potential coma and astigmatism can be corrected by an appropriate photo correction software when used in connection with a digital camera (not shown).

Figure 3:
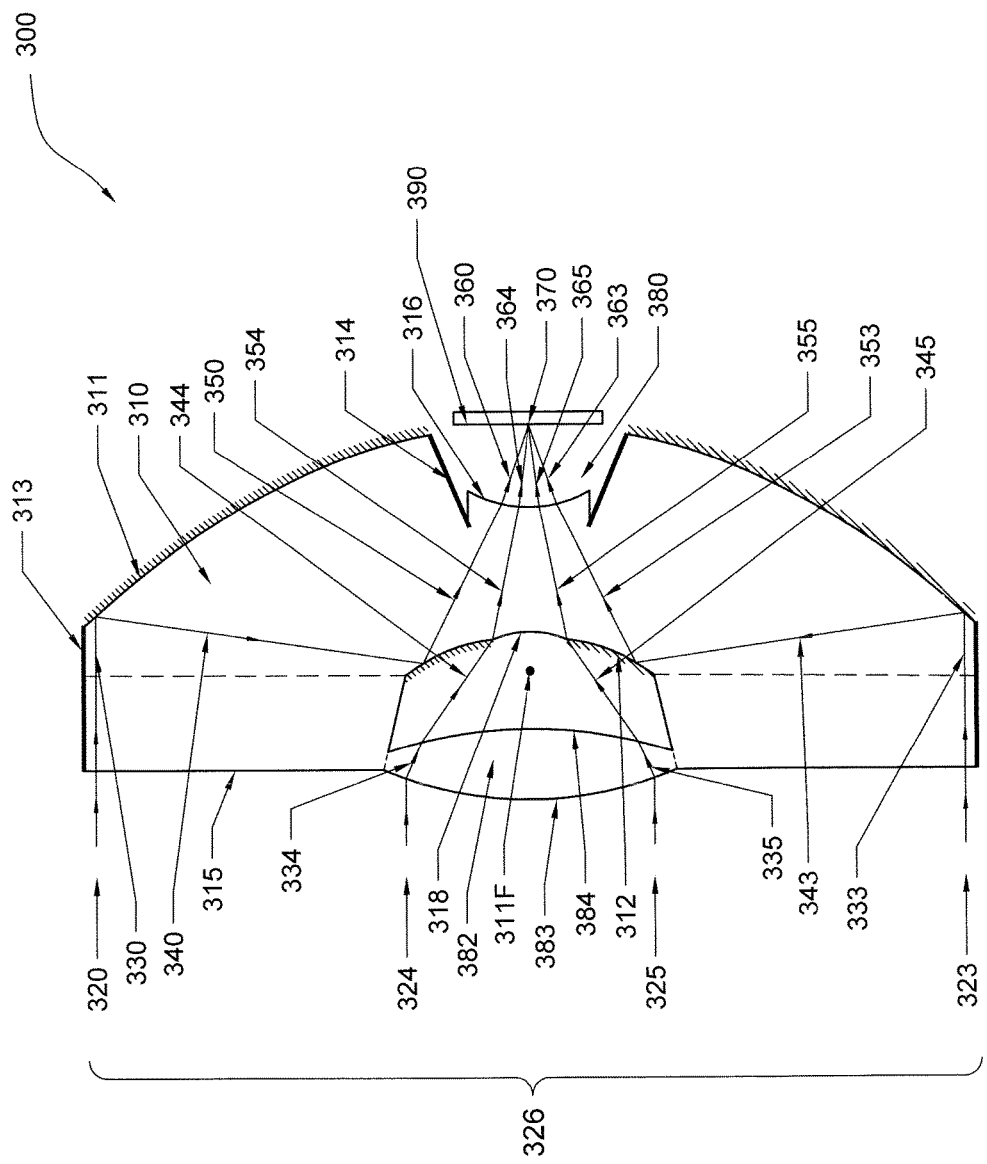
FIG. 3 is a side, cross sectional view of a catadioptric lens system according to a second illustrative embodiment of the present invention.

Referring to FIG. 3 there is shown a catadioptric lens system 300 according to a second embodiment of the present invention. The system 300 is in the form of a unitary optical member or monolithic member similar to the lens system 100 of FIG. 1, but includes an additional part whereby none of the incident light entering the aperture 326 of the lens system 300 is blocked by a secondary mirror 312 of the system. Components of the lens system 300 which are the same or essentially the same as components of the lens system 100 are indicated with similar reference numbers and are not discussed at length, but differences between the two systems are discussed below.

As depicted, a monolithic member 310 of the lens system 300 has a doughnut-shaped plano surface 315 which defines an aperture 326 through which light enters the member 310, and a first concave surface which may be coated with a highly/totally reflective coating such as aluminum or silver to define a primary mirror 311. The primary mirror 311 receives incident light that enters the member 310 through the aperture 126, and then compresses and redirects the received light toward a focal point 311F of the primary mirror 311. Further, the primary mirror 311 may have a recess or cavity 380 provided at a center portion thereof which extends inward of the member 310 and includes sidewall 314, such that the primary mirror 311 is generally doughnut-shaped or ring-shaped. A second curved surface is provided disposed internally of the optical member 310 spaced from the plano surface 315 such that it is a convex or hyperbolic surface which is also coated with a highly/totally reflective coating such as aluminum or silver and forms a secondary mirror 312. A third curved surface, concave surface 318, is provided in the center portion of the secondary mirror 312, and is not coated with a highly/totally reflective coating. Thus, the secondary mirror 312 is also generally doughnut-shaped or ring-shaped. The concave surface 318 may have magnification and focal ratios which are the same as magnification and focal ratios of the secondary mirror 312, and the primary mirror 311 may have a shape which redirects all of the incident light thereon towards the secondary mirror 312, including fully up to the inner edge of the secondary mirror 312 which borders with the outer periphery of the concave surface 318. At a center of the recess 380 there is provided a concave fourth curved surface 316 which is concave and defines an exit surface for light rays exiting the member 310. Particularly, the light which is further redirected and possibly further compressed by the secondary mirror 312 and the light which is redirected and possibly further compressed by the concave surface 318 are both directed to the concave surface 316, which then redirects all of the light outside of the member 310 through the recess 380.

According to another important difference, the member 310 may further include an additional biconvex positive lens 382 having a diameter which is the same or slightly larger than a diameter of the secondary mirror 312 and disposed in front of the secondary mirror 312. A convex surface 383 of the positive lens 382 is disposed to extend continuously at a central portion of the aperture 326, projecting outward therefrom, while another convex surface 384 of the positive lens 382 is provided internally of the member between the surfaces 383 and 318. With the biconvex positive lens 382 other incident light rays entering the aperture 326 which would otherwise be blocked by the secondary mirror 312 are instead directed by the lens 382 to the concave surface 318, and from there to the concave surface 316 which directs the light out through the recess 380. Jointly, the concave surfaces 318, 316 create a negative lens. The positive lens 382 along with such negative lens forms a refractive telescope, which may have the same magnification ratio and focal ratio as those of the secondary mirror 312. Therefore, the lens system 300 receives incident light rays in parallel path of both catoptrics and dioptrics.

For manufacturing the member 310 including the curved surfaces 318, 384 and the secondary mirror 312 disposed internally thereof, the member 310 may be constructed in two parts which are adhesively bonded together, e.g., adjacent faces of the two parts may be bonded along a plane indicated by the dotted lines in FIG. 3, i.e., those extending outward either toward the plano surface 315 or those extending outward toward an edge circular band 313 from the secondary mirror 312. With such two part construction, the secondary mirror 312 and the concave surface 318 may be formed in one part and the convex surface 384 may be formed in the other part. The two parts may be made of same transparent optical material such as acrylic or glass, and an appropriate transparent adhesive may be used to bond the two parts together. The space between the convex surface 384 and the secondary mirror 312 may be filled with air or some other gas, or with transparent optical material. The member 310 thus constructed may still be considered a monolithic member.

When typical incident light rays 320, 323, 324, and 325 enter the member 310 through the aperture 326, including the entire incident light surface 315 and the convex surface 383, an incident light ray 320 enters the surface 315 and becomes a light ray 330. It is reflected by the primary mirror 311 to become a light ray 340 and converges to the secondary mirror 312. It then is reflected to become a light ray 350 and further converges towards the concave surface 316 and diverges to become a light ray 360 towards a focal target 370 where an image sensor 390 is located. Similarly, light ray 323 becomes 333, then 343, then 353, and finally 363. Other incident light rays between light rays 324 and 325 go through the positive lens 382. A light ray 324 goes through the convex surface 383 and becomes a light ray 334. It converges to leave the convex surface 384 of the positive lens 382 to become a light ray 344. It enters the concave surface 318 and diverges to become a light ray 354. It exits the concave surface 316 and diverges to become a light ray 364 towards the focal target 370. Similarly, light ray 325 become 335, then 345, then 355, and final 365. Therefore, all incident light rays entering the aperture 326 go through the catadiotric lens 300 to the focal target 370 without any of the light rays being blocked by the secondary mirror 312. Hence, there is no black pupil/iris blur problem at all. An edge circular surface band 313 and recess sidewall 314 may be treated with light-blocking treatment and will provide the same benefits as the treated edge circular surface band 113 and recess sidewall 114 in the lens system 100 in FIG. 1.

Such catadioptric lens system 300 achieves all of the advantages achieved by the catadioptric lens system 100 according to the first embodiment of the present invention, and a further advantage that none of the incident light rays entering the aperture 326 are blocked by the secondary mirror 312 at all, resulting in improved image quality, e.g., it increases the brightness of the image to the same degree as a dioptric telescope lens. Given that the member 310 is formed from the two parts with the secondary mirror 312 disposed internally of the member 310, total thickness and mass of the member 310 are somewhat larger than those of the member 110 according to the first embodiment, and the manufacturing process is more involved because of the additional the positive lens 382 that must be formed and because the two parts must be bonded together.

Referring to FIGS. 4, 4A there is shown a catadioptric lens system 400 according to a third embodiment of the present invention. The system 400 is similar to the system 100 in FIG. 1 in many respects and components of the lens system 400 which are the same or essentially the same as components of the lens system 100 are indicated with similar reference numbers and are not discussed at length, but differences between the two systems are discussed below.

The system 400 is also in the form of a unitary optical member or monolithic member 410 similar to the lens system of FIG. 1, but is different therefrom in two respects. First, a secondary mirror 412 of the member 410 does not have any opening or uncoated curved surface defined in a central portion thereof such as the third curved surface 118 in the member 110, so that the secondary mirror 412 blocks all incident light entering a central portion of an aperture 426 of the member 410. Second, a curved surface 416 disposed centrally of a recess 480 formed at a central portion of a primary mirror 411, and through which light rays exit the member 410, is not completely curved such as the concave surface 116 of the member 110. Instead, the curved surface 416 is also conical-shaped at a central portion thereof. The conical-shaped concave surface 416 is an integration of a conical surface and a concave surface. A vertex of the conical-shaped concave surface 416 has a point surface 486, whereas the concave surface 116 of the member 110 in FIG. 1 is a fully concave surface and a vertex thereof is a smooth surface. An important function of the conical surface part of the conical-shaped curved surface 416 is that it joins/overlaps/combines multiple incoming angled light rays together without any space/void therebetween as it redirects the light rays to exit the member 410 to a focal target 470. For example, in the system 400 of FIG. 4 the light rays 451, 452 are separately redirected by the secondary mirror 412 to the conical-shaped concave surface 416 with a void 499 between the rays 451-452 as caused by a reflected angle of the secondary mirror 412, which does not have any opening or uncoated curved surface defined in a central portion thereof, while the point surface 486 receives the rays 451, 452 and combines them as exit light ray 461 (462) directed to the focal target 470. Other parts of the conical-shaped curved surface 416 besides the point surface 486 also redirect light rays from the secondary mirror 412 toward the focal target 470, but without combining the light rays together similar to the concave surface 116 of the member 110 in FIG. 1. Though such combining function the conical-shaped concave surface 416 is able to eliminate a black pupil/iris blur problem which would otherwise be created by the secondary mirror 412 which completely blocks the incident light rays that enter the central portion of the aperture 426. If the conical-shaped concave surface 416 was a fully concave surface such as the concave surface 116 of the member 110, the exit light rays would have some missing light rays in the center of the rays, and the missing light rays would make a black pupil in the center of the image. If the conical-shaped concave surface 416 was only a conical surface, the exit light rays would not be focused. An axis 485 is the center of the lens 400.

Referring to FIG. 4A, there is shown an enlargement of the cross section of the conical-shaped concave surface 416 of the member 410. As shown, the cross section of the surface 416 includes a portion 416U that curves upward from the point surface 486 and a portion 416L which curves downward from the point surface 486. Shown in dotted lines 416UT, 416LT are two tangents which respectively extend from the point surface 486 upward long curved section 416U and downward long curved section 416L. If the surface 416 was fully concave without the point surface 486 there would only be one tangent perpendicular to the axis 485 at the center of the curve.

A brief discussion of the operation of the system 400 is as follows. When typical incident light rays 420, 421,422 and 423 enter the member 410 through the aperture 426, they pass through the entire plano surface 415. An incident light ray 420 enters the surface 415 and becomes a light ray 430. It is reflected by the primary mirror 411 to become a light ray 440 and converges to the secondary mirror 412. It then is reflected to become a light ray 450 and further converges towards the conical-shaped concave surface 416 and diverges to become a light ray 460 towards the focal target 470 where the image sensor 490 is located. Similarly, a light ray 423 becomes 433, then 443, then 453, and final 463. On the other hand, a light ray 421 become a light rays 431, then a light ray 441, then a light ray 451 to exactly the point surface 486 of the conical-shaped concave surface 416 and diverges on the axis 485 to become a light ray 461 towards the focal point 470. Similarly, a light ray 422 become a light rays 432, then a light ray 442, then a light ray 452 to exactly the point surface 486 of the conical-shaped concave surface 416 and diverges on the axis 485 to become a light ray 462 towards the focal target 470. Therefore, after the light rays 461 and 462 pass through the point surface 486 of the conical-shaped concave surface 416 they are overlapped/combined exactly on the axis 485. Because there is a central area 417 on the convex second mirror 412 between innermost light rays 451 and 452 where there are no light rays, this results in a corresponding space/void 499 between the light rays 451 and 452. This area 417 would undesirably show up as a black pupil on an image as discussed before if the conical-shaped concave surface 416 was instead formed as a fully concave surface such as the surface 116 in the lens system 100. However, since exit light rays 461 and 462 are overlapped on the axis 485, there is no light ray void between them. Hence, the black pupil problem is eliminated by the conical-shaped concave surface 416.

An advantage of the catadioptric lens 400 in FIG. 4 over the catadioptric lens system 100 in FIG. 1 is that the lens system 400 has a more simple construction, e.g., the secondary mirror 412 of the lens system 400 can be manufactured more efficiently and with less expense than the secondary mirror 112 of the lens system 100 having the uncoated convex surface 118 at its central portion, but is still able to eliminate the black pupil problem. However, the lens system 400 does not receive any incident light rays through a central portion of the secondary mirror 412 and the image formed by the light rays being output by the lens 400 would correspondingly not be as bright as the image formed by the light rays being output by the lens system 100.

Modifications may be made to the lens system 400 similar to some of the possible changes to the lens system 100 discussed above. For example, the recess 480 and the conical-shaped concave surface 416 may be formed at any desired depth into the member 410, the surface 416 may even project outward beyond the primary mirror 411 if desired, the curvature of the surface 416 may be modified so that it outputs collimated light rays similar to the surface 216 in FIG. 2, rather than outputting light rays to the focal target 470, etc.

Figures 5, 5A:
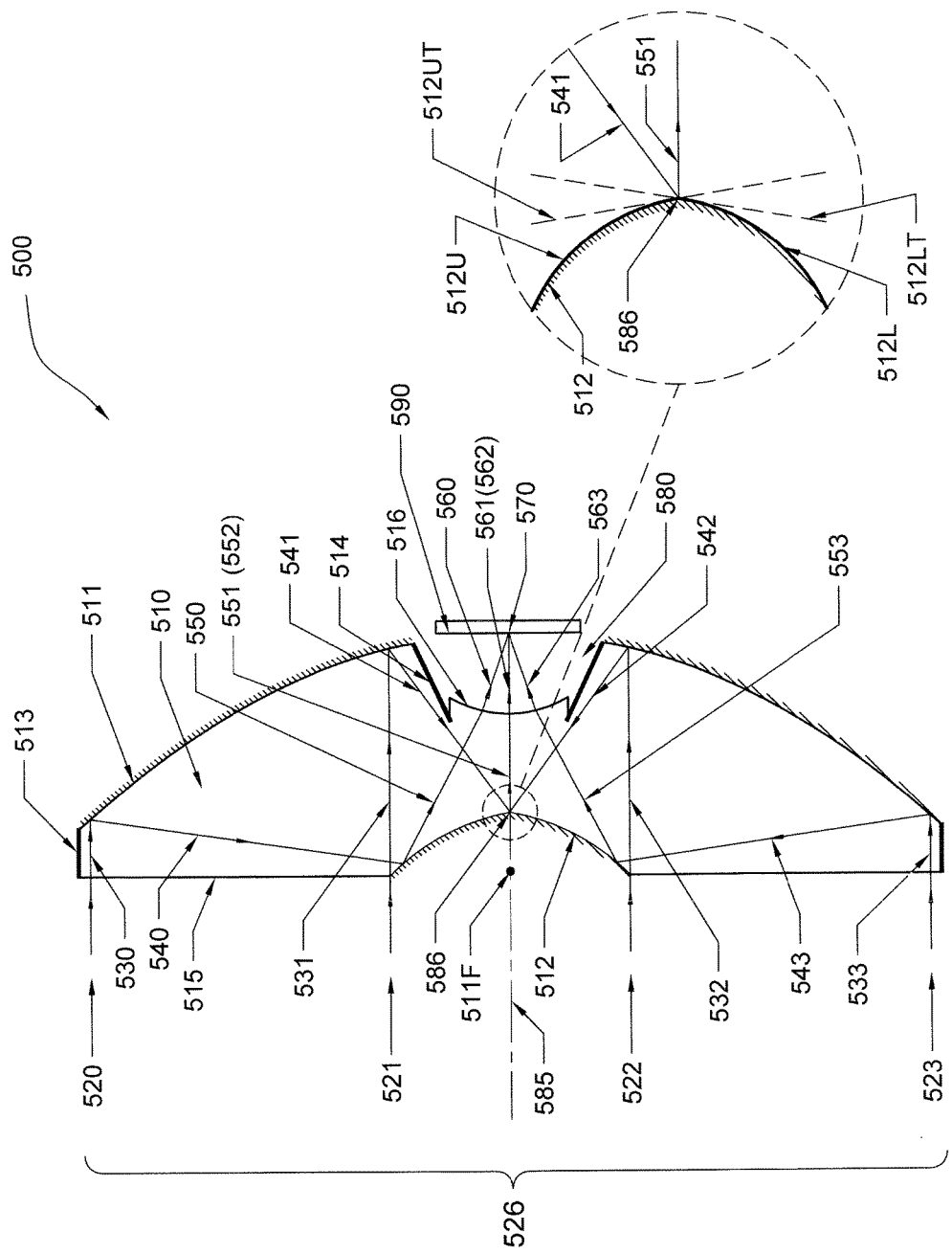
FIG. 5 is a side, cross sectional view of a catadioptric lens system according to a fourth illustrative embodiment of the present invention.
FIG. 5A is an enlargement of a portion of the embodiment of FIG. 5.

Referring to FIGS. 5, 5A there is shown a catadioptric lens system 500 according to a fourth embodiment of the present invention. The system 500 is very similar to the system 400 in FIGS. 4, 4A and components of the lens system 500 which are the same or essentially the same as components of the lens system 500 are indicated with similar reference numbers and are not discussed at length, but differences between the two systems are discussed below.

The system 500 is also in the form of a unitary optical member or monolithic member 510 similar to the lens system 400 of FIG. 4 including the unitary optical member 410, but is different therefrom in that a secondary mirror 512 thereof has a conical-shaped convex surface having a point surface 586 and an exit curved surface 516 thereof is fully concave. Such arrangement is opposite to the arrangement of the lens system 400 in which the exit curved surface thereof 416 of the member 410 includes the conical-shaped convex surface having the point surface 486, while the secondary mirror 412 is fully convex. The conical-shaped convex secondary mirror 512 is an integration of a conical mirror and a convex mirror. A vertex of the conical-shaped convex secondary mirror 512 has the point surface 586, and an important function of the conical mirror part of the conical-shaped convex secondary mirror 512 is that it joins/overlaps/combines multiple angled light rays, which have been redirected by a primary mirror 511 to the secondary mirror 512, together in reflection without any space/void therebetween as it redirects the light rays to the exit concave surface 516, which then redirects the light rays to exit the member 510 through recess 580 in a desired manner such as toward a focal target 570 of the surface 516 or in a collimated manner. Otherwise, the systems 400, 500 are the same. Axis 585 is the center axis of the lens system 500.

Referring to FIG. 5A, there is shown an enlargement of the cross section of the conical-shaped convex secondary mirror 512 of the member 510. As shown, the cross section of the secondary mirror 512 includes a portion 512U that curves upward from the point surface 586 and a portion 512L which curves downward from the point surface 586. Shown in dotted lines 512UT, 512LT are two tangents which respectively extend from the point surface 586 upward long curved section 512U and downward long curved section 512L. If the mirror 512 was fully convex without the point surface 586 there would only be one tangent perpendicular to the axis 585 at the center of the curve.

A brief discussion of the operation of the system 500 is as follows. When typical incident light rays 520, 521, 522 and 523 enter the member 510 through an aperture 526, they pass through the entire plano surface 515. An incident light ray 520 enters the surface 515 and becomes a light ray 530. It is reflected by the primary mirror 511 to become a light ray 540 and converges to the secondary mirror 512. It then is reflected to become a light ray 550 and further converges towards the concave exit surface 516 and diverges to become a light ray 560 towards the focal target 570 where an image sensor 590 is located. Similarly, a light ray 523 becomes 533, then 543, then 553, and finally 563. On the other hand, a light ray 521 become a light rays 531, then a light ray 541 to exactly the point surface 586 of the conical-shaped convex secondary mirror 512 and diverges on the axis 585 to become a light ray 551 towards the concave surface 516 and then become a light ray 561 towards the focal target 570. Similarly, a light ray 522 become a light rays 532, then a light ray 542 to exactly the point surface 586 and diverges on the axis 585 to become a light ray 552 towards the curved exit surface 516 and then become a light ray 562 towards the focal target 570. Therefore, when the light rays 541 and 542 are reflected by the point surface 586 of the conical-shaped convex secondary mirror 512 they are overlapped/combined exactly on the axis 485. The function of the conical mirror part of the secondary mirror 512 is to join two incoming angled light rays together in reflection to eliminate the black pupil/iris blur problem. The function of the convex mirror part of the secondary mirror 512 is to converge the light rays. If the secondary mirror 512 was fully concave, there would be some missing light rays in the center of the secondary mirror similar to the situation in the catadioptric lens system 400 of FIG. 4 as discussed above. If the secondary mirror 512 was only a conical mirror, the light rays would not be focused.

Modifications may be made to the lens system 500 similar to some of the possible changes to the lens system 100 discussed above. For example, the recess 580 and the concave surface 516 may be formed at any desired depth into the member 510, the surface 516 may even project outward beyond the primary mirror 511 if desired, the curvature of the concave surface 516 may be modified so that it outputs collimated light rays similar to the surface 216 in FIG. 2, rather than outputting light rays to the focal target 570, etc.

An advantage of the catadioptric lens system 500 in FIG. 5 over the catadioptric lens system 100 in FIG. 1 is that the lens system 500 has a more simple construction, e.g., the secondary mirror 512 of the lens system 500 can be manufactured more efficiently and with less expense than the secondary mirror 112 of the lens system 100 having the uncoated convex surface 118 at its central portion, but is still able to eliminate the black pupil problem. However, the lens system 500 does not receive any incident light rays through a central portion of the secondary mirror 512 and the image formed by the light rays being output by the lens system 500 would correspondingly not be as bright as the image formed by the light rays being output by the lens system 100.

Lens Systems Including Discrete Structures

Figure 6:
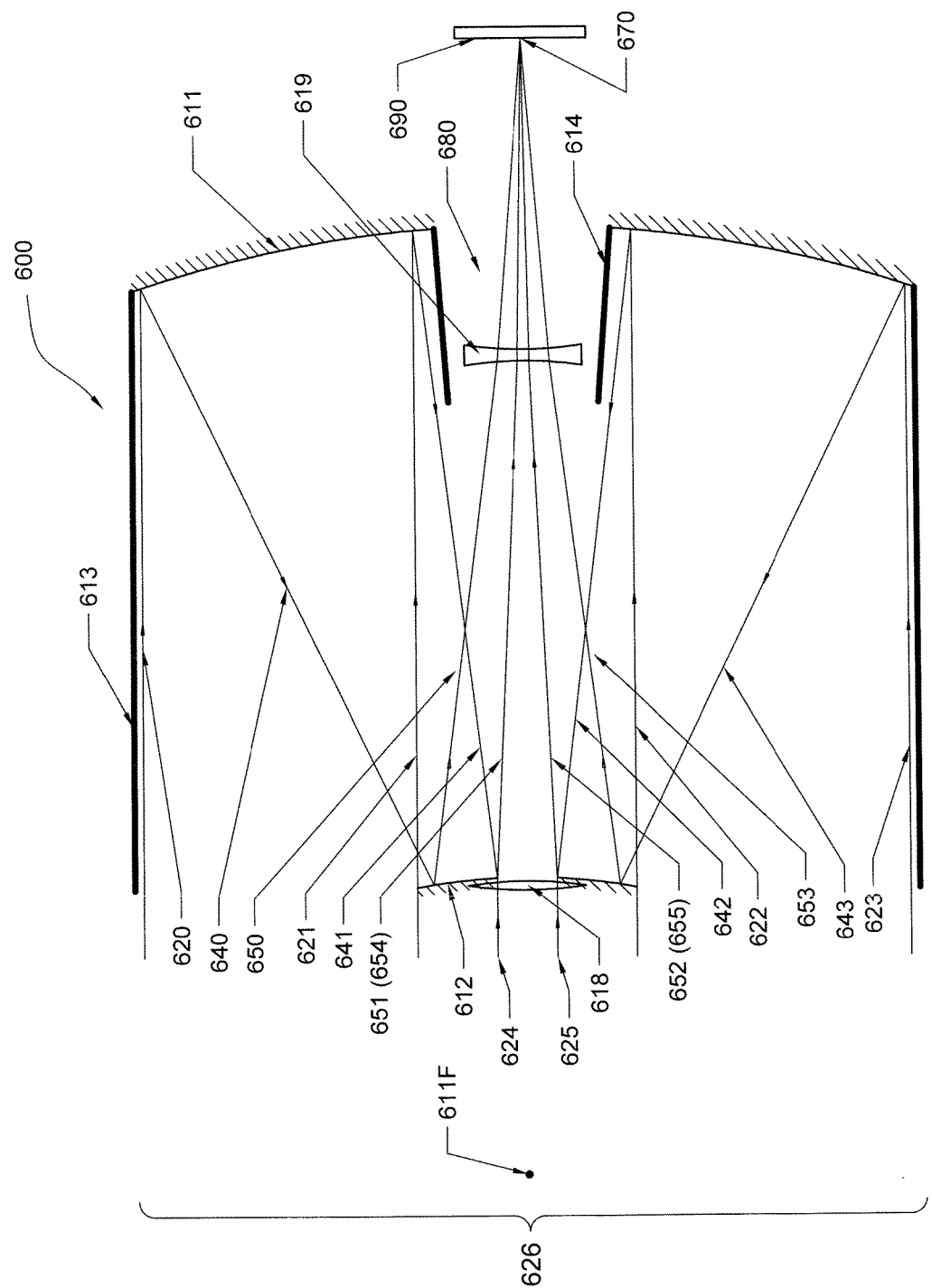
FIG. 6 is a side, cross sectional view of a catadioptric lens system according to a fifth illustrative embodiment of the present invention.

Referring to FIG. 6 there is shown a catadioptric lens system 600 according to a fifth embodiment of the present invention. The system 600 is somewhat similar to the system 100 in FIG. 1, although the system 600 includes multiple discrete components combined together in specific positional relationships within a light-blocking housing 613, whereas the components of the system 100 are combined together in the monolithic member 110. Components of the lens system 600 which correspond to components of the lens system 100 are indicated with similar reference numbers and are not discussed at length, but differences between the two systems are discussed below.

FIG. 6 shows a focusing catadioptric lens system 600 in cross sectional view. It includes a two-piece Cassegrain mirror lens, a type of telephoto lens, constructed by 2 discrete mirrors, i.e., a doughnut-shaped concave primary mirror 611 with an opening 680 defined at a central portion thereof and a doughnut-shaped convex secondary mirror 612 with an opening at a central portion thereof, as well as a refractive telescope including lenses 618, 619. The primary mirror 611 is disposed at one end of the housing 613 and closes the end except at the central opening 680 thereof, and through which light rays will exit the system. An opposite end of the housing 613 is open and defines an aperture 626 through which incident light enters the system, while a focal point 611F of the primary mirror 611 is disposed outward beyond the aperture 626 and the secondary mirror 612 is disposed inward of the aperture at a central portion of the housing 613. The secondary mirror 612 receives the light redirected by the primary mirror 611 and further redirects the same toward the opening 680 in the center portion of the primary mirror 611 and toward the focal target 670 of the second mirror 612. The opening defined at the center portion of the secondary mirror 612 permits other incident light entering the system through the aperture 626 to pass without being reflected. A positive first lens 618, which directs the other incident light to pass through the opening at the central portion of the secondary mirror 612, may be placed adjacent to the secondary mirror 612 in front of the opening and a focal point of the lens 618 may also be at the focal target 670 of the secondary mirror 612. A negative second lens 619, which is disposed closer to the primary mirror 611 than is the positive first lens 618, receives and redirects the incident light from the secondary mirror 612 as well as from the first lens 618 and redirects all of such light toward the focal target 670 of the secondary mirror, where it is received by an image sensor 690. The lenses 618, 619 form a refractive telescope. Indicated at 614 is a light-blocking wall which is generally tubular but tapers to a smaller diameter as it extends inward of the primary mirror 611, which blocks unwanted light rays (not shown) from passing through the opening 680, similar to the light blocking coating on the side wall 114 in the first embodiment.

Such catadioptric lens system 600 according to the fifth aspect of the present invention is essentially a telephoto lens system which combines aspects of a reflective telescope (the primary and secondary mirrors 611, 612) with a aspects of a refractive telescope (the first and second lenses 618, 619), and is effective for overcoming the black pupil/iris blur problem because the first and second lenses transmit incident light toward the focal target of the secondary mirror 612 that would otherwise be blocked by the secondary mirror 612 if the secondary mirror 612 had no opening defined therein. In this regard, the first lens 618 may have an outer circumferential size which is smaller than that of the secondary mirror 612, and still be appropriate for overcoming the black pupil/iris blur problem because the other incident light which passes through the opening in the center portion of the secondary mirror 612 and is redirected by the first and second lenses 618, 619 becomes combined with the incident light that is redirected and possible further compressed by the secondary mirror 612 with no voids therebetween, even though some incident light entering the lens system through aperture 626 may still be blocked by the secondary mirror 612. The system prevents voids between the light redirected by the first and second lenses and the light redirected by the secondary mirror because all of such light is directed toward the focal target 670 of the secondary mirror 612, and because the secondary mirror fully surrounds the opening in the center portion thereof so that light reflected by the portion of the secondary mirror 612 which is directly adjacent to the opening appears fully consistent with the light passing through the opening. Also, because the first lens 618 has magnification and focal ratios which are the same as magnification and focal ratios of the secondary mirror 612, and because the primary mirror 611 may have a shape which redirects all of the incident light thereon towards the secondary mirror 612, such features of the system according to the present invention overcomes the black pupil/iris blur problem so that the lens system provides a high quality output with both sharpness and brightness.

Briefly, operation of the system 600 is as follows. When typical incident light rays 620, 621, 622, 623, 624, and 625 pass through the aperture 626 and shine on the primary mirror 611, an incident light ray 620 is reflected by the primary mirror 611 to become a light ray 640 and converges to the secondary mirror 612. It then is reflected to become a light ray 650 and further converges towards the focal target 670 where the image sensor 690 is located. Similarly, a light ray 621 become 641, then 651, a light ray 622 become 642, then 652, and a light ray 623 become 643, then 653. The light rays then pass through the negative second lens 619 and converge to the focal target 670. On the other hand, an incident light ray 624 goes through the positive lens 618 and becomes a light ray 654, while the system 600 is designed so that the light ray 654 overlaps with the light ray 651 reflected off the secondary mirror 612. Similarly an incident light ray 625 become a light ray 655 which overlaps with the light ray 652 reflected off the secondary mirror 612. Therefore catadioptric lens 600 not only solves the black pupil problem but also brings extra incident light rays onto the image through the opening in the secondary mirror 612 to improve image quality, even though there is still some incident light rays blocked by the secondary mirror 612. If the secondary mirror 612 had no hole in the center, there would be missing light rays between light rays 651 and 652. That could cause a black pupil problem as discussed before. Now the missing light rays are filled with incident light rays collected by the lens 618.

Similarly to the concave surface 116 in the first embodiment, curvature of the negative second lens 619 may be adjusted to make exit light rays parallel or afocal, rather than focused toward the focal target 670. If desired the system 600 may be modified in various ways. For example, a negative lens (not shown) may be optionally added before the focal target 670 to increase the focal length or to make the exit light rays afocal.

Figure 7:
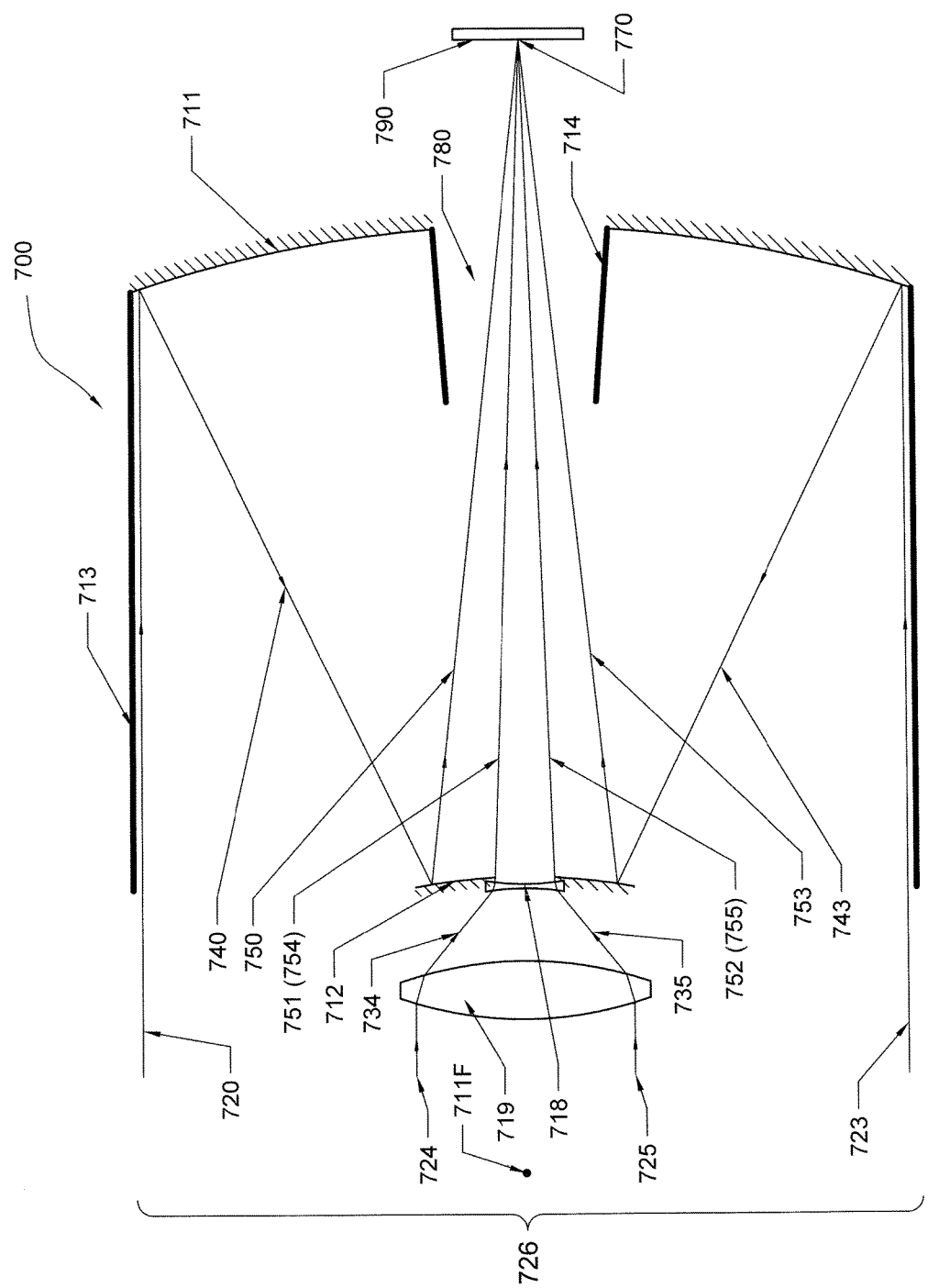
FIG. 7 is a side, cross sectional view of a catadioptric lens system according to a sixth illustrative embodiment of the present invention.

Referring to FIG. 7 there is shown a catadioptric lens system 700 according to a sixth embodiment of the present invention. The system 700 is very similar to the system 600 in FIG. 6, except that the shapes, sizes and positions of the two lenses are changed so that all of the incident light entering an aperture 726 of the system is compressed and redirected out of the system, or in other words none of the incident light entering an aperture 726 of the system is blocked by a secondary mirror 712 of the system. Components of the lens system 700 which correspond to components of the lens system 600 are indicated with similar reference numbers and are not discussed at length, but differences between the two systems are discussed below. Essentially, a negative first lens 718 may be positioned closer to a secondary mirror 712 than to a positive second lens 719, and the second lens 719 may have an outer circumference which is the same as or slightly larger than that of the secondary mirror 712. In this arrangement the second lens 719 may compress and redirect any other incident light that would otherwise be blocked by the secondary mirror to the first lens 718, which then redirects the light through the opening in the center portion of the secondary mirror 712.

FIG. 7 shows a focusing catadioptric lens 700 in cross sectional view. It includes a two-piece Cassegrain mirror lens, a type of telephoto lens, constructed by two discrete mirrors, i.e., a doughnut-shaped concave primary mirror 711 with an opening 780 defined at a central portion thereof and a doughnut-shaped convex secondary mirror 712 with an opening at a central portion thereof, as well as a refractive telescope including lenses 619, 618. The primary mirror 711 is disposed at one end of light blocking housing 713 and closes the end except at the central opening 780 thereof, and through which light rays will exit the system. An opposite end of the housing 713 is open and defines an aperture 726 through which incident light enters the system, while a focal point 711F of the primary mirror 711 is disposed outward beyond the aperture 726 and the secondary mirror 712 is disposed inward of the aperture at a central portion of the housing 713. The secondary mirror 712 receives the light redirected by the primary mirror 711 and further redirects the same toward the opening 780 in the center portion of primary mirror 711 and toward the focal target 770 of the secondary mirror 712. The opening defined at the center portion of the secondary mirror 712 permits the other incident light entering the system through the aperture 726 to pass without being reflected after such light is compressed and redirected by the second lens 719 and the first lens 718. The negative first lens 718, which directs the other incident light to pass through the opening at the central portion of the secondary mirror 712, may be placed adjacent to the secondary mirror 712 in front of the opening and a focal target of the lens 718 may also be at the focal target 770 of the secondary mirror 712. The positive second lens 719, which is disposed further from the secondary mirror 712 than the first lens 718, receives the other incident light entering the aperture 726, compresses and redirects the incident light to the first lens 718 which then redirects and possibly further compresses such light toward the focal target 770 of the secondary mirror 712, where it is received by an image sensor 790. Indicated at 714 is a light-blocking wall which is generally tubular but tapers to a smaller diameter as it extends inward of the primary mirror 711, which blocks unwanted light rays (not shown) from passing through the opening 780, similar to the light blocking coating on the side wall 114 in the system 100 in FIG. 1. Preferably, the lenses 719, 718 forming the center refractive telescope structure may have a same magnification ratio and focal ratio as those of the reflective mirror structure formed by the primary and secondary mirrors 711, 712.

Briefly, operation of the system 700 is as follows. When typical incident light rays 720, 723, 724, and 725 enter the system 700 through the aperture 726 they shine on the primary mirror 711. An incident light ray 720 is reflected by the primary mirror 711 to become a light ray 740 and converges to the secondary mirror 712. It then is reflected to become a light ray 750 and further converges towards the focal target 770 where the image sensor 790 is located. Similarly, a light ray 723 become 743, then 753. On the other hand, the light ray path in the refractive telescope structure is as follows. Another incident light ray 724 goes through the positive lens 719 and converges to become a light ray 734. It then goes through the negative lens 718 and diverges to become a light ray 754 which overlaps with light ray 751 towards the focal target 770. Similarly, another incident light ray 725, becomes 735, then 755 which overlaps with light ray 752 towards the focal target 770. The focal target 770 is also for the secondary mirror 712. Therefore all incident light rays entering the aperture 726 pass through the catadioptric lens system 700 to the focal target 770 without any of the light rays being blocked by the secondary mirror 712. Hence, there is no black pupil/iris blur problem at all, and image quality is improved in relation to the system 600 in which some incident light is blocked. Similarly to the exit curved surface 116 in the lens system 100 in FIG. 1, curvature of the negative first lens 718 may be adjusted to make exit light rays parallel or afocal, rather than focused toward the focal target 770. Again, if desired the system 700 may be modified in various ways. For example, a negative lens (not shown) may be optionally added before the focal target 770 to increase the focal length or to make the exit light rays afocal.

The system 700 achieves all of the advantages achieved by the system 600. Additionally, the catadioptric lens system 700 in FIG. 7 provides a further advantage over the catadioptric lens 600 system in FIG. 6 because no incident light rays are blocked by the secondary mirror at all. This increases the brightness of the image to the same degree as a dioptric telescope lens.

Figure 8:
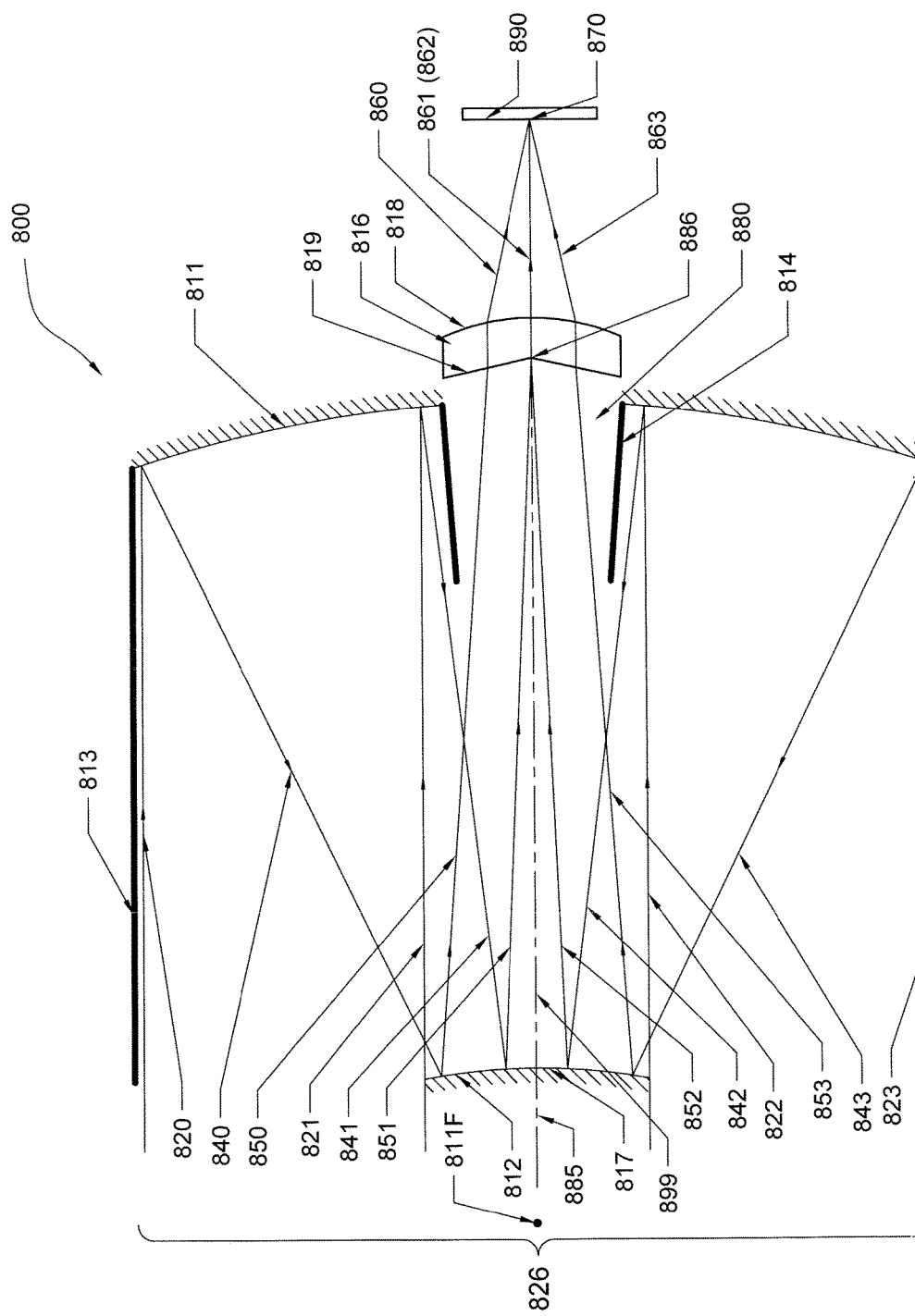
FIG. 8 is a side, cross sectional view of a catadioptric lens system according to a seventh illustrative embodiment of the present invention.

Referring to FIG. 8 there is shown a catadioptric lens system 800 according to a seventh embodiment of the present invention. The system 800 is somewhat similar to the system 400 in FIG. 4, although the system 800 includes multiple discrete components combined together in specific positional relationships within a light-blocking housing 813, whereas the components of the system 400 are combined together in the monolithic member 410. Components of the lens system 800 which correspond to components of the lens system 400 are indicated with similar reference numbers.

The on-axis catadioptric lens system 800 includes: a first reflective concave surface or primary mirror 811 which is doughnut shaped with an opening 880 in a central portion thereof and which receives incident light which passes through an aperture 826, compresses and redirects the incident light toward a focal point 811F of the primary mirror 811; a second reflective convex surface or secondary mirror 812 which is disposed between the primary mirror 811 and the focal point of the primary mirror 811, which receives the light redirected by the primary mirror 811 and further redirects and possibly further compresses the same toward the opening 880 defined at the center portion of the primary mirror 811; and a lens 816 disposed adjacent to, inside or outside, the opening 880, which receives the light redirected by the secondary mirror 812 and directs the received light in a direction away from the primary and secondary mirrors. The lens 816 is not a typical positive or negative type lens, but is a conical lens. Instead, one of a light-receiving surface 819 and a light-exiting surface 818 of the lens 816 is conical in shape with a point surface 886 at a center thereof and the other of said surfaces of the lens 816 is curved (in the depicted embodiment the surface 819 is conical and includes the point surface 886, while the surface 818 is convex), and the point surface 886 redirects light rays which are directed to the point surface such that the redirected light rays are joined/combined/overlapped with each other. In the system 800 the concave primary mirror 811 and the convex secondary mirror 812 form a typical Cassegrain mirror lens, a type of telephoto lens. On the other hand, the lens 816 is a concal (axicon) lens which combines one side conical surface 819 having the point surface 886 with the other convex surface 818, and redirects the light rays outward of the system. In this system 800 the lens 816 functions to eliminate the black pupil problem similarly to the exit curved surface 416 having the point surface 486 in the catadioptric lens system 400 in FIG. 4, e.g., by combining or overlapping reflected light rays it eliminates a space/void 899 that exists between the light rays when they are reflected off the secondary mirror 812. An axis 885 is the center of the catadioptric lens system 800. Indicated at 814 is a light-blocking wall which is generally tubular but tapers to a smaller diameter as it extends inward of the primary mirror 811, which blocks unwanted light rays (not shown) from passing through the opening 880, similar to the light blocking coating on the side wall 114 in the lens system 100 in FIG. 1.

Briefly, operation of the system 800 is as follows. When typical incident light rays 820, 821,822 and 823 enter the system through the aperture 826 they shine on and are reflected by the primary mirror 811. An incident light ray 820 is reflected by the primary mirror 811 to become a light ray 840 and converges to the secondary mirror 812. It then is reflected to become a light ray 850 and further converges towards the conical lens 816. The conical surface 819 bends the light ray 850 and the convex surface 818 converges the light ray 850 to become a light ray 860 towards a focal target 870 where an image sensor 890 is located. Similarly, a light ray 823 become 843, then 853, and final 863. On the other hand, a light ray 821 become a light rays 841, then a light ray 851 to exact the point surface 886 of the conical lens 816 and diverges on the axis 885 to become a light ray 861 towards the focal target 870. Similarly, a light ray 822 becomes a light rays 842, then a light ray 852 to exact the point surface 886 of the conical lens 816 and diverges on the axis 885 to become a light ray 862 towards the focal target 870. Therefore the light rays 861 and 862 after the conical lens 816 are overlapped exactly on the axis 885. The overlapping of the light rays 861, 862 is important because there is an area 817 on the secondary mirror 812 between light rays 851 and 852 where there are missing light rays, and this results in a space/void 899 between the light rays 851, 852 as they are redirected toward the lens 816, but because the lens 816 overlaps the light rays 861, 862 which are redirected by the point surface 886 the space/void is eliminated. The area 817 on the secondary mirror 812, and the corresponding void 899, would show up as a black pupil on an image received by image sensor 890 if there were no conical aspect to the lens 816. The system 800 is designed so that light rays 851 and 852 do not touch each other on the convex secondary mirror 812. If they did touch each other, the reflected light rays 851 and 852 would be crossed and no longer to be focused. Since exit light rays 861 and 862 are designed on the axis 885 there is no light ray void between them. Hence, the black pupil/iris blur problem is eliminated by the conical lens 816.

Although the lens 816 is depicted as redirecting the light rays toward the focal target 870, the curvature of the exit surface 818 of the lens 816 could be modified so that the exit light rays extend in parallel or afocal.

The system 800 achieves all of the advantages of the system 600 in FIG. 6. Additionally, the catadioptric lens system 800 in FIG. 8 has a further advantage over the catadioptric lens system 600 in FIG. 6 in that it uses only one lens 816 in a more a simple way to eliminate the black pupil problem. However, the system 800 does not receive any incident light rays through a central portion of the secondary mirror, contrary to the arrangement in the system 600, so that the image output by the system is not as bright as that output by the system 600.

Figures 9, 9A:
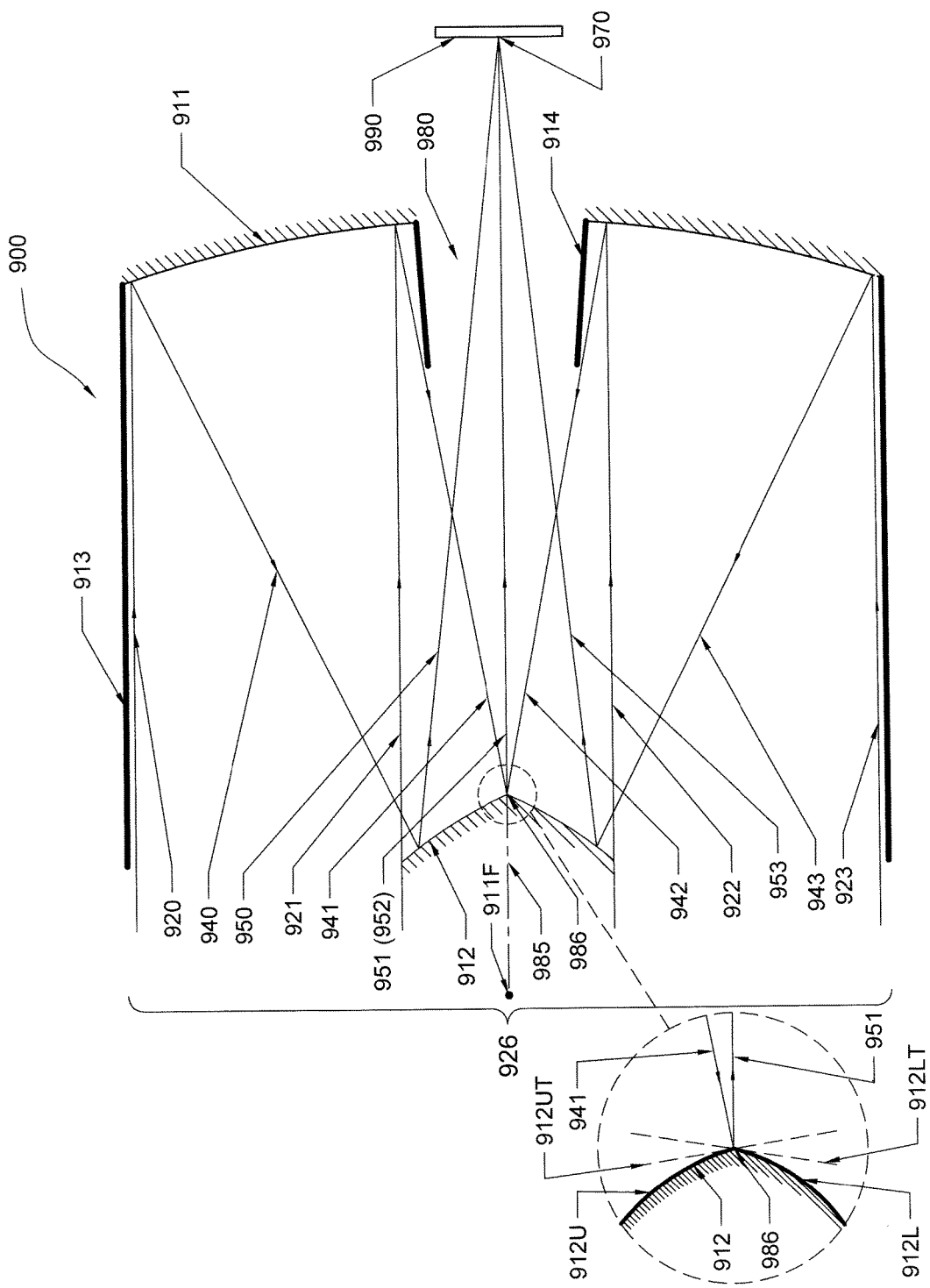
FIG. 9 is a side, cross sectional view of a catadioptric lens system according to a eighth illustrative embodiment of the present invention.
FIG. 9A is an enlargement of a portion of the embodiment of FIG. 9.

Referring to FIGS. 9, 9A there is shown an on-axis catadioptric lens system 900 according to an eighth embodiment of the present invention. The system 900 is somewhat similar to the system 800 in FIG. 8, although the system 900 includes as primary components only primary and secondary mirrors, with no associated lens such as the lens 816 of the system 800. The system 900 is somewhat similar to the system 500 in FIG. 5, although the system 900 includes multiple discrete components combined together in specific positional relationships within a light-blocking housing 913, whereas the components of the system 500 are combined together in the monolithic member 510. Components of the lens system 900 which correspond to components of the lens system 800 are indicated with similar reference numbers.

The on-axis catadioptric lens system 900 includes: on-axis catadioptric lens system comprising: a first reflective concave surface or primary mirror 911 which receives incident light compresses and redirects the incident light toward a focal point 911F of the primary mirror 911, the primary mirror 911 having an opening 980 defined at a center portion thereof; and a second reflective surface or secondary mirror 912 which is disposed between primary mirror 911 and the focal point of the primary mirror 911, which receives the light redirected by the primary mirror 911 and further redirects and possibly further compresses the light through the opening 980 defined at the center portion of the primary mirror 911. The secondary mirror 912 is convex and conical in shape with a point surface 986 at a center thereof; and the point surface 986 functions to overlap/combine light rays which are directed to the point surface by the primary mirror 911 and then redirect the overlapped light rays outward of the system 900 through the opening 980. Additionally, the secondary mirror 912 has no opening defined through any portion thereof. Indicated at 914 is a light-blocking wall which is generally tubular but tapers to a smaller diameter as it extends inward of the primary mirror 911, which blocks unwanted light rays (not shown) from passing through the opening 980, similar to the light blocking coating on the side wall 114 in the lens system 100 in FIG. 1.

FIG. 9 shows a focusing catadioptric lens 900 in cross sectional view. The concave primary mirror 911 is doughnut-shaped and receives incident light that enters the system through an aperture 926, and together with the conical-shaped convex secondary mirror 912 form a typical Cassegrain mirror lens, a type of telephoto lens. The conical-shaped convex, secondary mirror 912 is an integration of a conical mirror and a convex mirror. The vertex of the conical-shaped convex mirror 912 has a point surface 986, unlike a fully convex surface which is smooth with no point surface. The function of the conical aspect of the secondary mirror 912 is to eliminate the black pupil/iris blur problem similar to the conical aspect of the conical-shaped convex surface 512 in the lens system 500 in FIG. 5 as discussed above. The function of the convex aspect of the secondary mirror 912 is to converge the light rays. If the secondary mirror 912 was fully convex, there would be some missing light rays in the center of the secondary mirror as discussed in catadioptric lens 500 in FIG. 5. If the secondary mirror 912 was fully conical, the light rays would not be focused. An axis 985 is the center of the lens system 900.

Referring to FIG. 9A, there is shown an enlargement of the cross section of the conical-shaped convex secondary mirror 912 of the system 900. As shown, the cross section of the surface 912 includes a portion 912U that curves upward from the point surface 986 and a portion 912L which curves downward from the point surface 986. Shown in dotted lines 912UT, 912LT are two tangents which respectively extend from the point surface 986 upward long curved section 912U and downward long curved section 912L. If the surface 912 was fully convex without the point surface 986 there would only be one tangent perpendicular to the axis 985 at the center of the curve.

Briefly, operation of the system 900 is as follows. When typical incident light rays 920, 921, 922 and 923 enter the system 900 the aperture 926 they shine on the primary mirror 911 and are compressed and redirected toward the secondary mirror 912. An incident light ray 920 is reflected by the primary mirror 911 to become a light ray 940 and converges to the secondary mirror 912. It then is reflected to become a light ray 950 and further converges towards a focal target 970 where an image sensor 990 is located. Similarly, light ray 923 becomes 943, then 953. On the other hand, light ray 921 becomes light ray 941 to exact the point surface 986 of the conical-shaped convex secondary mirror 912, then it is reflected to become a light ray 951 on the axis 985 towards the focal target 970. Similarly, light ray 922 becomes a light ray 942 to exact the point surface 986 of the conical-shaped convex secondary mirror 912, then it is reflected to become a light ray 952 on the axis 985 towards the focal target 970. Because the light rays 951 and 952 are designed to be on the axis 985, there are no light rays or void between them. Hence, the black pupil problem is eliminated by the conical-shaped convex secondary mirror 912.

Again, it will be recognized that modifications may be made to the embodiment shown in FIGS. 9, 9A similar to modifications which have been discussed in relation to other embodiments of the present invention. For example, the curvature of the convex part of the conical-shaped convex secondary mirror 912 could be modified to exit light rays in afocal or collimated manner, an additional negative lens could be disposed before the focal target to change the light rays to an afocal or collimated condition, etc.

The system 900 achieves all of the advantages of the systems 500 and 800. Additionally, the system 900 in FIG. 9 achieves a further advantage over the systems 500 and 800 in that it includes only the primary and secondary mirrors as the main functional components thereof without any associated lens(es), and is a simple way to eliminate the black pupil problem. However the system 900 does not receive any incident light rays through the central portion of the secondary mirror 912 which has no opening defined therein, such that the resulting image is not as bright as the resulting image in the system 600.

Although the exemplary embodiments described above have been discussed as having certain components and arrangement, persons of ordinary skill in the art will understand that various modification and additions may be made thereto within the scope of the present invention as defined in the claims appended hereto. For example, there have been discussed herein some possible changes and optional features that may be used with some of the exemplary embodiments. It will be understood that such possible changes and optional features that may be used with others of the exemplary embodiments as long as they are not incompatible therewith.

Figure 10:
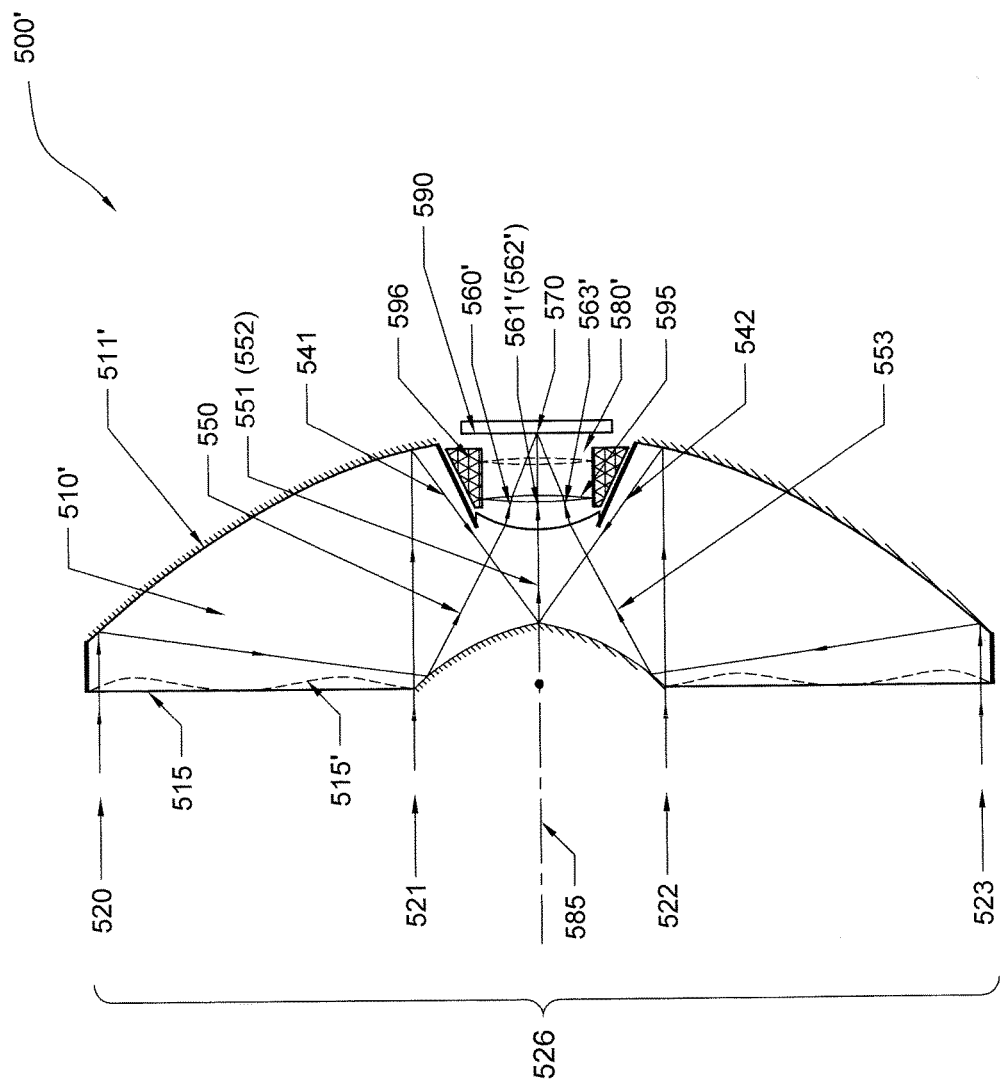
FIG. 10 is a side, cross sectional view of a modified version of the catadioptric lens system of FIG. 5.
Figure 11:
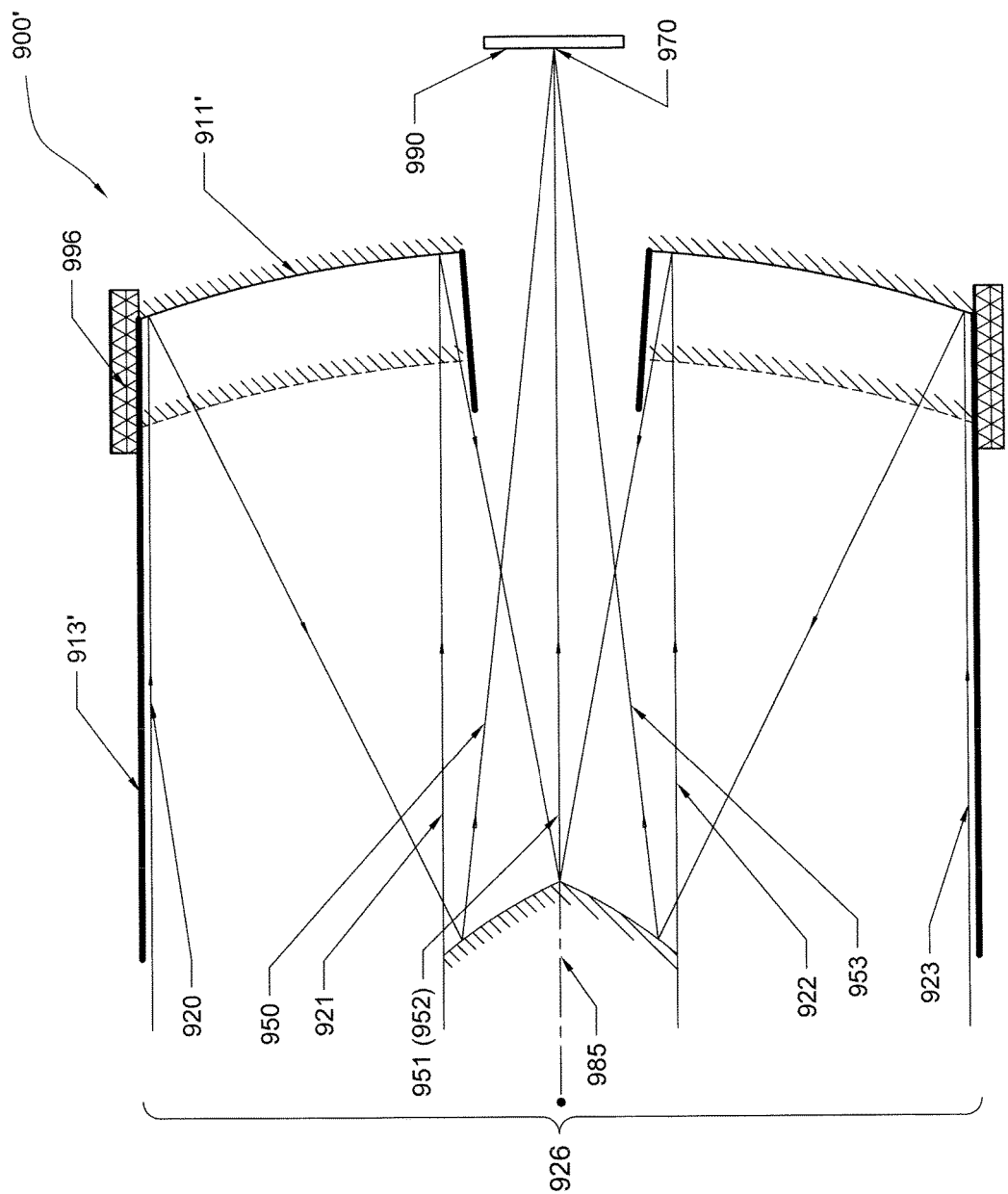
FIG. 11 is a side, cross sectional view of a modified version of the catadioptric lens system of FIG. 9.

As another example, it is possible to combine any of the above embodiments with other components such as additional lens(es) or a zooming lens mechanism. FIGS. 10, 11 herein correspond to the embodiments of FIGS. 5 and 9, respectively, but which additionally include a zooming mechanism. Referring to FIG. 10 there is shown a catadioptric lens system 500' according to a modification of the fourth embodiment of the present invention shown in FIG. 5. The system 500' is identical to the system 500 in FIGS. 5, 5A in most respects, but additionally includes a zooming mechanism disposed within the recess 580' which extends inward of the monolithic member 510' at the center of the primary mirror 511'. The zooming mechanism may include a zooming lens 595 and a mechanism 596 which can move the lens 595 inward and outward relative to the recess 580' along axis 585. The device 596 may be automated, e.g., including a step motor driven screw nut, or a manually adjustable, e.g., including a manually turnable screw nut. Again, such a zooming mechanism may be used in any monolithic lens system according to the present invention, including those shown in FIGS. 1-5A. Additionally, the plano surface 515 may be modified such that it is aspheric 515' to correct any spherical aberration such as indicated by the dotted lines in FIG. 10.

Referring to FIG. 11 there is shown a catadioptric lens system 900' according to a modification of the embodiment of the present invention shown in FIG. 9. The system 900' is identical to the system 900 in FIG. 9 in most respects, but additionally includes a zooming mechanism 996 disposed on the outside of the housing 913' and connected to the primary mirror 911', and which can move the primary mirror 911' inward and outward in the direction of the central axis 985 of the system. The zooming mechanism 996 may be automated, e.g., including a step motor driven screw nut, or a manually adjustable, e.g., including a manually turnable screw nut. Again, such a zooming mechanism may be used in any lens system with a discrete structure according to the present invention, including those shown in FIGS. 6-9.

I claim:

1. An on-axis catadioptric lens system comprising a unitary optical member formed of a material having a positive refractive index, wherein the optical member includes:
   a plano surface which receives incident light therethrough;
   a first curved surface having a reflective coating provided thereon which receives the incident light after it passes through the plano surface and compresses and redirects the incident light toward a focal point of the coated first curved surface;

a recess extending inward of the optical member at a center portion of the coated first curved surface;

a second curved surface having a reflective coating provided thereon which is disposed between the coated first curved surface and the focal point of the coated first curved surface, which receives the light redirected by the coated first curved surface, and further redirects the same toward a focal target of the coated second curved surface;

a third curved surface disposed at a center portion of the coated second curved surface, and which receives and redirects other incident light toward the focal target of the coated second curved surface; and a fourth curved surface provided at a center of the recess, which receives the light redirected by the coated second curved surface and the other light redirected by the third curved surface, and redirects said lights outward of the optical member through the recess, wherein all of said curved surfaces aligned along a central axis of the catadioptric lens system.

2. The on-axis catadioptric lens system according to claim 1, wherein a side wall of the recess at the center of the first curved surface and an outer circumferential surface of the optical member extending between the plano surface and the coated first curved surface are provided with a light barrier treatment that blocks light from passing therethrough.

3. The on-axis catadioptric lens system according to claim 1, wherein the fourth curved surface redirects light rays either toward a focal target or in an afocal, collimated arrangement.

4. The on-axis catadioptric lens system according to claim 1, further comprising an additional optical device disposed in the recess extending inward of the optical member at a center portion of the coated first curved surface.

5. The on-axis catadioptric lens system according to claim 1, wherein a thickness of the monolithic member is approximately ¼ of a diameter of the plano surface.

6. The on-axis catadioptric lens system according to claim 1, wherein the plano surface is aspheric.

7. An on-axis catadioptric lens system comprising a unitary optical member formed of a material having a positive refractive index, wherein the optical member includes:

a plano surface which receives incident light therethrough;

a first curved surface having a reflective coating provided thereon which receives the incident light after it passes through the plano surface and compresses and redirects the incident light toward a focal point of the coated first curved surface;

a recess extending inward of the optical member at a center portion of the coated first curved surface;

a second curved surface having a reflective coating provided thereon which is disposed between the coated first curved surface and the focal point of the coated first curved surface, which receives the light redirected by the coated first curved surface, and further redirects the same toward a focal target of the coated second curved surface;

a third curved surface disposed at a center portion of the coated second curved surface, which redirects other incident light toward the focal target of the coated second curved surface;

a fourth curved surface provided at a center of the recess, which receives the light redirected by the coated second curved surface and the other light redirected by the third curved surface, and redirects said lights outward of the optical member through the recess;

a fifth curved surface disposed at a central portion of the plano surface and which receives the other incident light, and a sixth curved surface disposed between the fifth curved surface and the coated second curved surface, and which functions together with the fifth curved surface to redirect other incident light rays to the third curved surface, wherein all of said curved surfaces aligned along a central axis of the catadioptric lens system.

8. The on-axis catadioptric lens system according to claim 7, wherein fifth curved surface has an outer circumferential dimension which is larger than an outer circumferential dimension of the coated second curved surface.

9. The on-axis catadioptric lens system according to claim 7, wherein the coated second curved surface, the third curved surface and the sixth curved surface are disposed internally of the optical member.

10. The on-axis catadioptric lens system according to claim 7, wherein a side wall of the recess at the center of the first curved surface and an outer circumferential surface of the optical member extending between the plano surface and the coated first curved surface are provided with a light barrier treatment that blocks light from passing therethrough.

11. The on-axis catadioptric lens system according to claim 7, wherein the fourth curved surface redirects light rays either toward a focal target or in an afocal, collimated arrangement.

12. The on-axis catadioptric lens system according to claim 7, further comprising an additional optical device disposed in the recess extending inward of the optical member at a center portion of the coated first curved surface.

13. The on-axis catadioptric lens system according to claim 7, wherein the plano surface is aspheric.

14. An on-axis catadioptric lens system comprising a unitary optical member formed of a material having a positive refractive index, wherein the optical member includes:

a plano surface which receives incident light therethrough;

a first curved surface having a reflective coating provided thereon which receives the incident light after it passes through the plano surface and compresses and redirects the incident light toward a focal point of the coated first curved surface;

a recess defined at a center portion of the coated first curved surface, which recess extends inward of the unitary optical member;

a second curved surface having a reflective coating provided thereon which is disposed between the coated first curved surface and the focal point of the coated first curved surface, which receives the light redirected by the coated first curved surface and further redirects the light toward a focal target of the coated second curved surface; and a third curved surface provided at a center of the recess, the third curved surface receives the light redirected by the coated second curved surface and redirects said received lights through the recess to outside of the optical member, wherein one of the coated second curved surface and the third curved surface is curved and conical with a point surface at a center thereof, and wherein the first, second and third curved surfaces are all aligned along a central axis of the catadioptric lens system.

15. The on-axis catadioptric lens system according to claim 14, wherein the coated second curved surface is curved and conical with a point surface at a center thereof.

16. The on-axis catadioptric lens system according to claim 14, wherein the third curved surface is curved and conical with a point surface at a center thereof.

17. The on-axis catadioptric lens system according to claim 14, wherein a side wall of the recess at the center of the first curved surface and an outer circumferential surface of the optical member extending between the plano surface and the coated first curved surface are provided with a light barrier treatment that blocks light from passing therethrough.

18. The on-axis catadioptric lens system according to claim 14, wherein a thickness of the monolithic member is approximately ¼ of a diameter of the plano surface.

19. The on-axis catadioptric lens system according to claim 8, wherein the plano surface is aspheric.

20. The on-axis catadioptric lens system according to claim 14, wherein the third curved surface redirects light rays either toward a focal target or in an afocal, collimated arrangement.

* * * * *